(12) United States Patent
Ooida et al.

(10) Patent No.: US 7,916,231 B2
(45) Date of Patent: Mar. 29, 2011

(54) DISPLAY DEVICE

(75) Inventors: Jun Ooida, Mobara (JP); Takahiro Miyazaki, Mobara (JP); Ken Ohara, Chiba (JP); Hiroshi Saito, Fujisawa (JP); Yoshiaki Nakayoshi, Ooamishirasato (JP)

(73) Assignee: Hitachi Displays, Ltd., Chiba-ken (JP)

( * ) Notice: Subject to any disclaimer, the term of this patent is extended or adjusted under 35 U.S.C. 154(b) by 178 days.

(21) Appl. No.: 12/155,612

(22) Filed: Jun. 6, 2008

(65) Prior Publication Data
US 2009/0033817 A1 Feb. 5, 2009

(30) Foreign Application Priority Data
Jun. 7, 2007 (JP) ................. 2007-151175

(51) Int. Cl.
G02F 1/1368 (2006.01)
(52) U.S. Cl. .......................... 349/43; 349/42
(58) Field of Classification Search .................. None
See application file for complete search history.

(56) References Cited

U.S. PATENT DOCUMENTS

| | | | | |
|---|---|---|---|---|
| 5,204,659 A | * | 4/1993 | Sarma | 345/89 |
| 5,235,448 A | * | 8/1993 | Suzuki et al. | 349/43 |
| 6,795,142 B2 | * | 9/2004 | Chae et al. | 349/106 |
| 2003/0098935 A1 | * | 5/2003 | Lee et al. | 349/43 |
| 2004/0211961 A1 | * | 10/2004 | Koo et al. | 257/59 |
| 2006/0152644 A1 | * | 7/2006 | Yi | 349/42 |
| 2008/0225191 A1 | * | 9/2008 | Ohara et al. | 349/39 |

FOREIGN PATENT DOCUMENTS

| | | | | |
|---|---|---|---|---|
| JP | 2-306221 | A | * | 12/1990 |
| JP | 05-232512 | | | 2/1992 |
| JP | 4-338729 | A | * | 11/1992 |
| JP | 7-98461 | A | * | 4/1995 |
| JP | 09-258261 | | | 3/1996 |

* cited by examiner

*Primary Examiner* — Mike Stahl
(74) *Attorney, Agent, or Firm* — Stites & Harbison PLLC; Juan Carlos A. Marquez, Esq.

(57) ABSTRACT

A display device comprising a plurality of scan signal lines; a plurality of picture signal lines three-dimensionally intersecting the plurality of scan signal lines; and numerous TFT elements arranged in a matrix; and having a display panel in which each of the TFT elements has a gate connected to one of the plurality of scan signal lines, and a drain or source connected to one of the plurality of picture signal lines; wherein the TFT elements respectively differ in terms of channel width, channel length, or both, depending on a distance from a signal input terminal of the scan signal line to which the gate is connected and a distance from a signal input terminal of the picture signal line to which one of the drain and the source is connected.

4 Claims, 26 Drawing Sheets

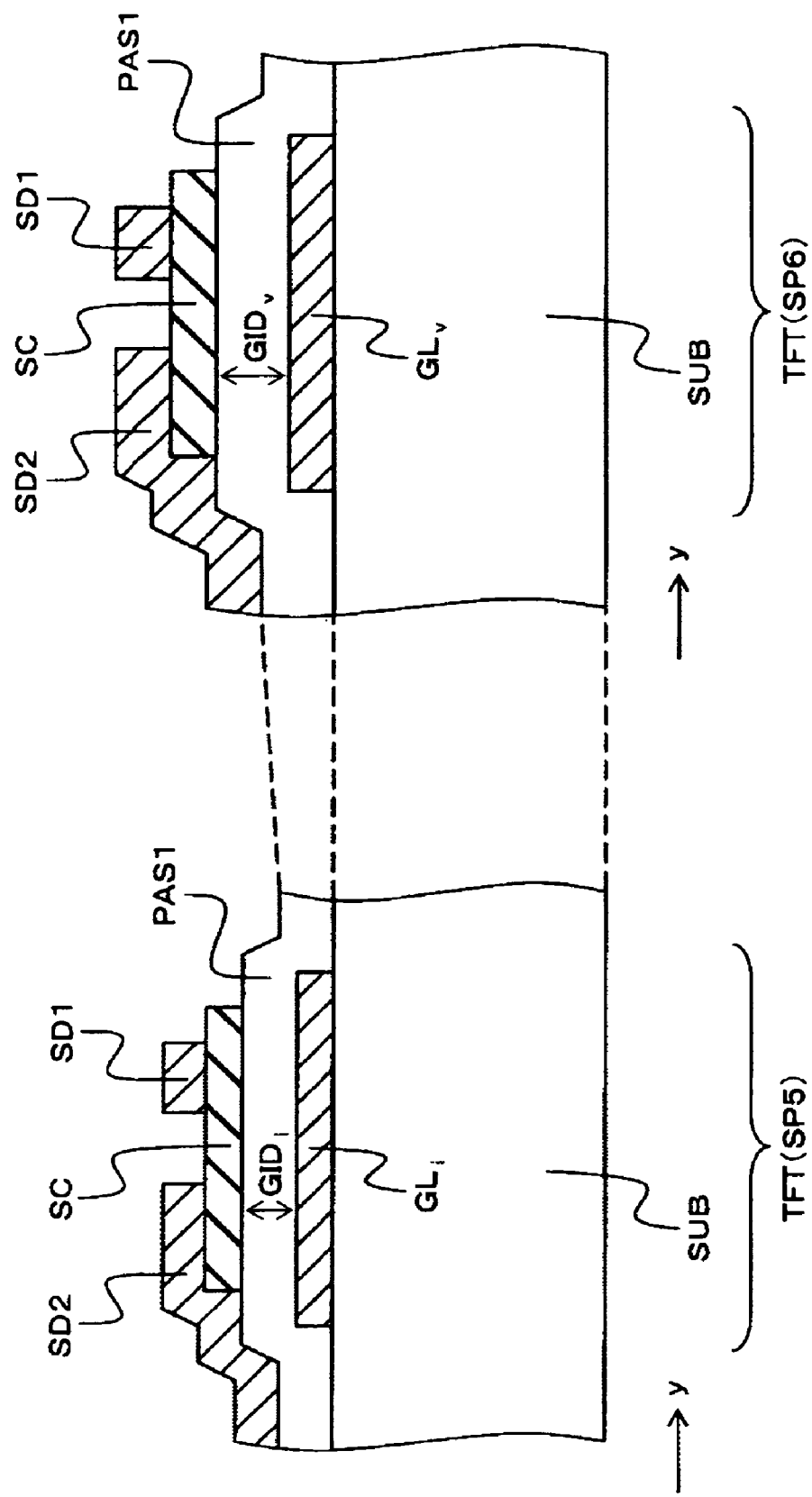

DISPLAY DEVICE

CROSS-REFERENCE TO RELATED APPLICATION

The present application claims priority from Japanese application JP2007-151175 filed on Jun. 7, 2007, the content of which is hereby incorporated by reference into this application.

BACKGROUND OF THE INVENTION

1. Field of the Invention

The present invention relates to a display device, and in particular relates to a technology effective for implementation in liquid-crystal display devices of active matrix type having TFT elements disposed in a matrix arrangement.

2. Description of the Related Art

Some types of displays intended for use in televisions or personal computers (PCs) have conventionally employed, for example, liquid-crystal display devices of active matrix type. An active matrix type liquid-crystal display device has a liquid-crystal display panel in which liquid crystals are sealed between a pair of substrates, with numerous active elements (also called "switching elements") disposed in a matrix arrangement on one of the pair of substrates. In most cases, the active elements of the liquid-crystal display device will be TFT elements.

Of the pair of substrates, the substrate on which the TFT elements are disposed in a matrix (hereinafter called the "TFT substrate") includes the following on the surface of an insulating substrate such as a glass substrate: a plurality of scan signal lines, a plurality of picture signal lines three-dimensionally intersecting the scan signal lines, numerous TFT elements in a matrix arrangement, and numerous pixel electrodes in a matrix arrangement.

In an active matrix liquid-crystal display device, the display area of the liquid-crystal display panel is composed of an array of pixels, each of which having a TFT element and a pixel electrode connected to the source of the TFT element; the gate of each TFT element of multiple pixels arranged in the direction in which the scan signal lines extend will be connected, for example, to a single common scan signal line. Meanwhile, the drain of each TFT element of numerous pixels arranged in the direction in which the picture signal lines extend will be connected, for example, to a single common picture signal line.

The pixel electrode of each pixel, together with the liquid crystals and a common electrode (also called "counter electrode")), form a pixel capacitor (also called "liquid crystal capacitor").

Herein, with regard to the drain and source of the TFT elements, a junction with a pixel electrode will be referred to as the source, while a junction with a picture signal line will be referred to as the drain. However, in some instances, conversely, a junction with a pixel electrode is referred to as the drain, while a junction with a picture signal line is referred to as the source.

In an active matrix liquid-crystal display device, it is typical for the gates of multiple TFT elements arranged in the direction in which the scan signal lines extend to be connected to a single common scan signal line as described above. Under these circumstances, the bias condition of the TFT elements connected to a single common scan signal line will change according to the distance from a signal input terminal of the scan signal line. Specifically, the bias condition will differ between TFT elements having shorter distances between their gate and the signal input terminal of the scan signal line, and TFT elements having longer distances between their gate and the signal input terminal of the scan signal line. Such differences in the bias condition of TFT elements may result, for example, in variation of voltage known as "pre-write voltage", as well as voltage known as "feed-through voltage," among individual pixels (pixel electrodes).

Specifically, the pre-write voltage and feed-through voltage represent a difference in potential between the voltage of a gradation signal for a given pixel in a picture signal which has been input to a picture signal line, and the voltage which is actually written to the pixel electrode of the given pixel during the ON interval of the gate of the TFT element of the given pixel. If the pre-write voltage and feed-through voltage of individual pixels differ, irregular luminance, flicker, or other such problems become more pronounced, and irregularities in picture quality in a single display device (display panel) may become quite noticeable.

For this reason, in more recent active matrix TFT element liquid-crystal display devices, for multiple TFT elements having a gate connected to a single scan signal line, a method has been proposed for, e.g., varying the size (e.g. the W/L value (the channel width W divided by the channel length L)) of the individual TFT elements according to their distance from the signal input terminal of the scan signal line (refer to, e.g., Japanese Laid-open Patent Publication No. 5-232512 A and Japanese Laid-open Patent Publication No. 9-258261 A).

In the display devices disclosed in the above documents, in view of delay occurring in the scan signal input to the scan signal line, it is proposed for example that multiple TFT elements having a gate connected to a single scan signal line be formed in such a way that TFT elements situated greater distances away from the signal input terminal of the scan signal line will have a progressively larger W/L value. Specifically, in a configuration such as that shown in FIG. 18, for a number of TFT elements $Tr_{1,1}, \ldots, Tr_{1,j}, \ldots, Tr_{1,M}$ having a gate connected to a scan signal line $GL_1$, the TFT elements $Tr_{1,1}$ closest to the signal input terminal of the scan signal line $GL_1$ will be the smallest in size, with the size increasing progressively for TFT elements further away from the input terminal of the scan signal line $GL_1$. FIG. 18 is a model circuit diagram illustrating an example of a simplified configuration of a conventional liquid-crystal display panel. In FIG. 18, the triangular symbols at the left ends of the scan signal lines $GL_1$, $GL_{i-1}$, $GL_i$, $GL_{N-1}$, $GL_N$ denote signal input terminals for scan signals, while the triangular symbols at the upper ends of the picture signal lines $DL_1$, $DL_2$, $DL_j$, $DL_{j+1}$, $DL_M$ denote signal input terminals for picture signals.

SUMMARY OF THE INVENTION

Over the past several years, liquid-crystal display devices (liquid-crystal display panels) for use in liquid crystal TVs and the like have become increasingly large in terms of their screen size and feature higher definition. This has tended to be associated with higher line resistance and line capacitance, resulting not only in a delay of scan signals on the scan signal lines, but also in increased delay of the picture signal on the picture signal lines. Furthermore, in liquid-crystal display devices driven at high speeds; e.g., double speed, individual TFT elements will be required to perform switching operations within short time periods. For this reason, a larger variation in the aforementioned pre-write voltage and feed-through voltage is encountered in individual pixels having TFT elements in which the drain is connected to a single common picture signal line, for example.

However, in display devices of the prior art such as those disclosed in Japanese Laid-open Patent Publication No. 5-232512 and Japanese Laid-open Patent Publication No. 9-258261, the multiple TFT elements having a drain connected to a single common picture signal line are formed so as to have the same size W/L. That is, as shown in FIG. 18, for individual TFT elements $Tr_{1,1}, \ldots, Tr_{i,1}, \ldots Tr_{N,1}$ having a drain connected to a picture signal line $DL_1$, the size (W/L) of the TFT elements $Tr_{1,1}, \ldots, Tr_{i,1}, \ldots Tr_{N,1}$ will be a substantially unchanging value irrespective of the distance from the signal input terminal of the picture signal line $DL_1$. Similarly, for TFT elements which are connected to other picture signal lines, e.g. the individual elements $Tr_{1,j}, \ldots, Tr_{i,j}, \ldots Tr_{N,j}$ connected to a picture signal line $DL_j$, the size (W/L) of the individual TFT elements $Tr_1,j, \ldots, Tr_{i,j}, \ldots Tr_{N,j}$ will be a substantially unchanging value.

For this reason, with liquid-crystal display panels that have a "big screen" size, high definition, or a high driving speed, a planar distribution (two-dimensional distribution) will be observed in regard to variability of the aforementioned pre-write voltage and feed-through voltage in individual pixels. Consequently, with display devices of conventional design, such as those disclosed in the above publications, it will be difficult to avoid irregular luminance, flicker, and other such phenomena; and problems will be presented in regard to diminished display quality in a single liquid-crystal display device (liquid-crystal display panel).

It is therefore an object of the present invention to provide a technology for improving display quality in active matrix liquid-crystal display devices.

This and other objects and novel features of the present invention will be understood from the following description and accompanying drawings.

A general description of certain representative inventions among those disclosed herein follows.

The display device according to the present invention comprises a plurality of scan signal lines; a plurality of picture signal lines three-dimensionally intersecting the plurality of scan signal lines; numerous TFT elements arranged in a matrix; and a display panel in which each of the numerous TFT elements has a gate connected to one of the plurality of scan signal lines, and a drain or source connected to one of the plurality of picture signal lines; wherein the numerous TFT elements respectively differ in terms of channel width, channel length, or both, depending on a distance from a signal input terminal of the scan signal line to which the gate is connected and on a distance from a signal input terminal of the picture signal line to which one of the drain and the source is connected.

According to one aspect of the present invention, a plurality of TFT elements among the numerous TFT elements arranged in a matrix, in which the gate is connected to a common scan signal line may have a value obtained by dividing the channel width by the channel length, wherein the value may increase with increasing distance from the signal input terminal of the scan signal line; and a plurality of TFT elements among the numerous TFT elements arranged in a matrix, in which one of the drain and the source is connected to a common picture signal line may have a value obtained by dividing the channel width by the channel length, the value increasing with increased distance from the signal input terminal of the picture signal line.

According to another aspect of the present invention, a difference in the value obtained by dividing the channel width by the channel length in neighboring pairs among the plurality of TFT elements in which the gate is connected to the common scan signal line may get progressively smaller as the distance increases from the signal input terminal of the scan signal line; and a difference in the value obtained by dividing the channel width by the channel length in neighboring pairs among the plurality of TFT elements in which either one of the source and the drain is connected to the common picture signal line may get progressively smaller as the distance increases from the signal input terminal of the picture signal line.

According to yet another aspect of the present invention, a rate of change in the value obtained by dividing the channel width by the channel length for the plurality of TFT elements in which the gate is connected to the common scan signal line may change upon reaching a specific TFT element among the plurality of TFT elements, the rate of change in the value obtained by dividing the channel width by the channel length for TFT elements closer than the specific TFT element to the signal input terminal of the scan signal line may be greater than the rate of change in the value obtained by dividing the channel width by the channel length for TFT elements further than the specific TFT element from the signal input terminal of the scan signal line; and a rate of change in the value obtained by dividing the channel width by the channel length for the plurality of TFT elements in which either one of the drain and the source is connected to the common picture signal line may change upon reaching a specific TFT element among the plurality of TFT elements, and the rate of change in the value obtained by dividing the channel width by the channel length for TFT elements closer than the specific TFT element to the signal input terminal of the picture signal line may be greater than the rate of change in the value obtained by dividing the channel width by the channel length for TFT elements further than the specific TFT element from the signal input terminal of the picture signal line.

According to yet another aspect of the present invention, the specific TFT element among the plurality of TFT elements in which the gate is connected to a common scan signal line may be a TFT element situated at or near a position that divides a distance in a 1:2 ratio between the TFT element closest to the signal input terminal of the scan signal line and the TFT element furthest from the signal input terminal of the scan signal line, and the specific TFT element among the plurality of TFT elements whose drain or source is connected to a common picture signal line may be a TFT element situated at or near a position that divides in a 1:2 ratio a distance between the TFT element closest to the signal input terminal of the picture signal line and the TFT element furthest from the signal input terminal of the picture signal line.

According to yet another aspect of the present invention, a thickness of a gate insulating film of the TFT elements arranged in a matrix may differ depending on the distance from the signal input terminal of the scan signal line to which the gate is connected and on the distance from the signal input terminal of the picture signal line to which either one of the drain and the source is connected.

According to yet another aspect of the present invention, the display panel may be a liquid-crystal display panel having a liquid-crystal material sealed between a pair of substrates.

According to the present invention, it is possible to ameliorate the effects of variability in bias condition of a plurality of TFT elements in which the gate is connected to a single common scan signal line, as well as to ameliorate the effects of variation in the bias condition of the plurality of TFT elements in which the drain is connected to a single common picture signal line. Thus, the pre-write voltage and feed-through voltage of individual pixels making up the display area can be made substantially uniform, and the display quality in active matrix display devices can be improved.

Furthermore, according to the present invention, it is possible not only to ameliorate the effects of changes in the bias conditions of individual TFT elements caused by delay of the scan input to the scan signal line and delay of the picture signal input to the picture signal line, but also to ameliorate the effects of changes in the bias conditions of individual TFT elements caused by variability in the thickness of the gate insulating film in individual TFT elements. Display quality in active matrix display devices can be further improved as a result.

BRIEF DESCRIPTION OF THE DRAWINGS

Several preferred embodiments of the present invention will be described in detail hereinafter with reference to the accompanying drawings, wherein:

FIG. 12C is a model plan view depicting an example of a planar configuration of TFT elements of two pixels SP5, SP6 shown in FIG. 12A;

DETAILED DESCRIPTION OF THE INVENTION

The following detailed description of the embodiments of the present invention will make reference to the accompanying drawings. Components having an identical function are assigned identical numerals in all of the drawings which describe the embodiments, and are not discussed where to do so would be redundant.

Figure 1A:
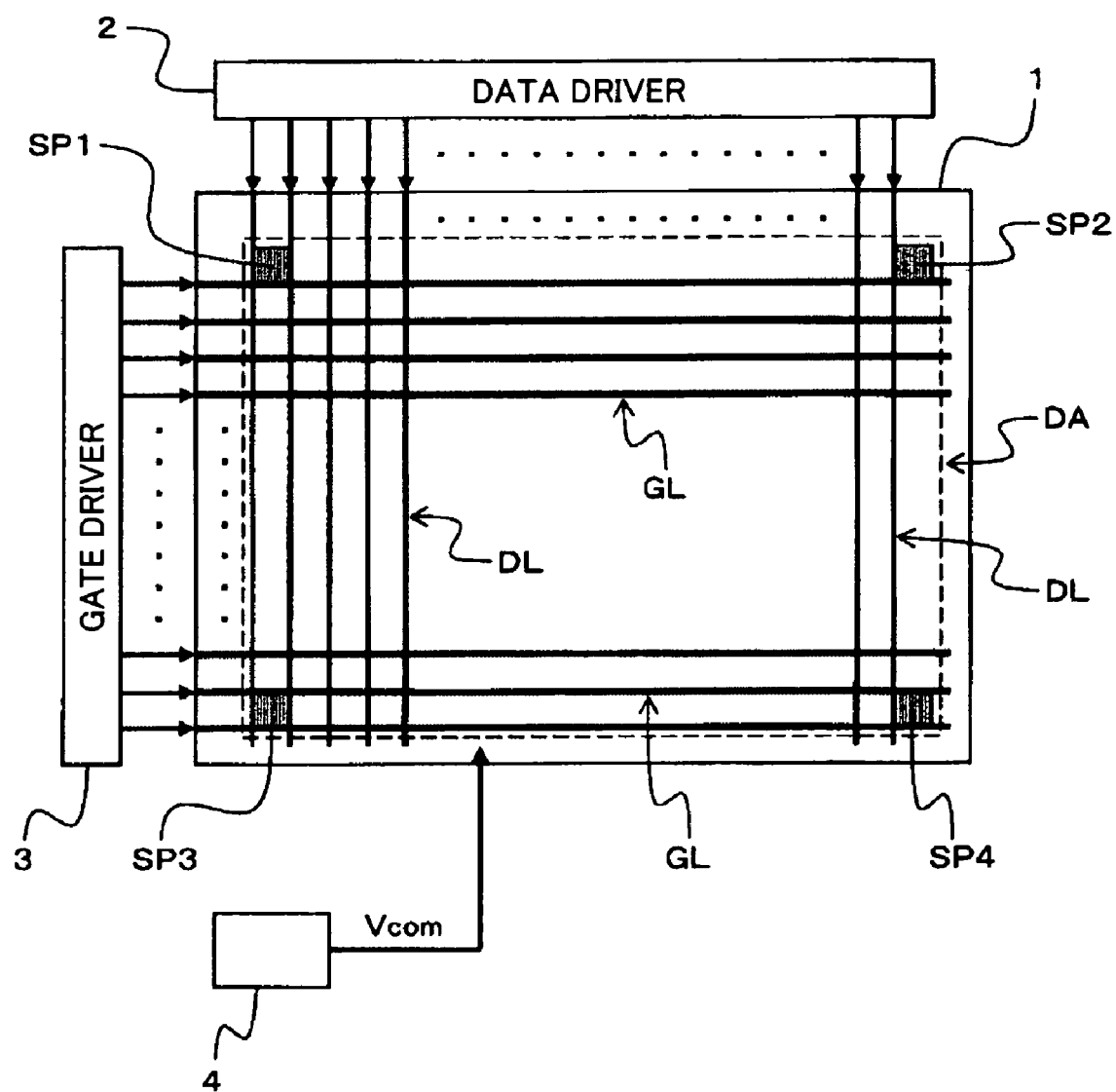
FIG. 1A is a model diagram depicting an example of a simplified design of a liquid-crystal display device according to an embodiment of the present invention.
Figure 1B:
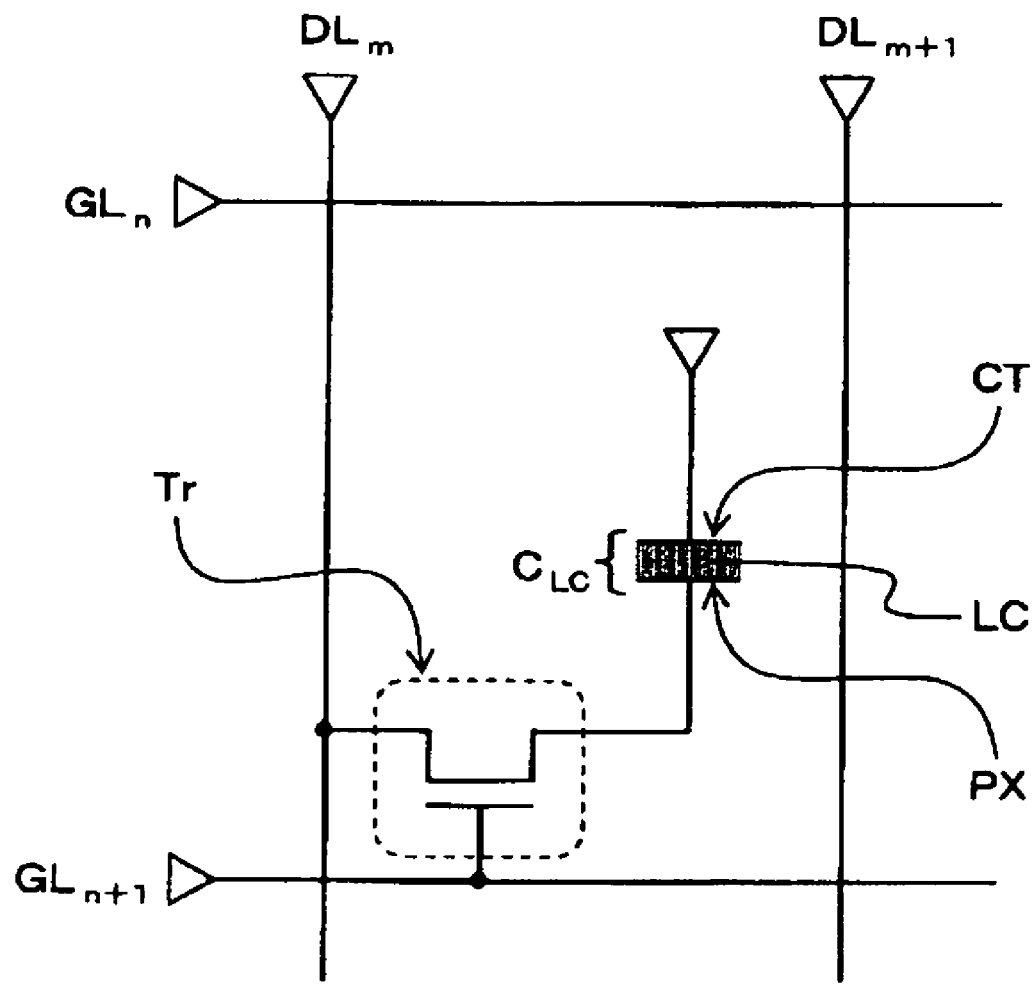
FIG. 1B is a model diagram depicting an example of a circuit design of an individual pixel of the liquid-crystal display panel shown in FIG. 1A.
Figure 2A:
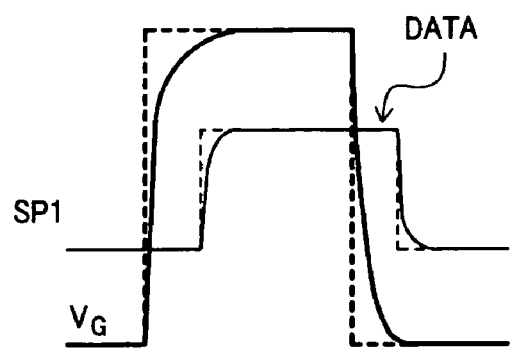
FIG. 2A is a model diagram depicting an example of a waveform of a scan signal and waveform of a picture signal which are input to the TFT element of a pixel SP1 located within the display area of the liquid-crystal display panel shown in FIG. 1A.
Figure 2B:
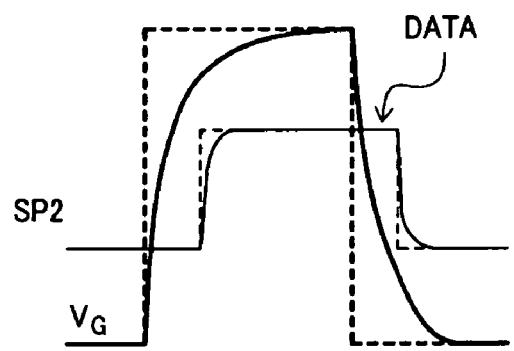
FIG. 2B is a model diagram depicting an example of a waveform of a scan signal and waveform of a picture signal which are input to the TFT element of a pixel SP2 located within the display area of the liquid-crystal display panel shown in FIG. 1A.
Figure 2C:
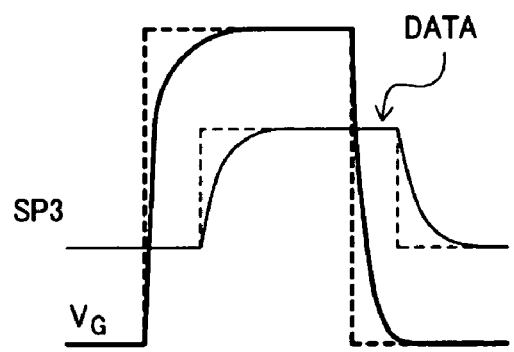
FIG. 2C is a model diagram depicting an example of a waveform of a scan signal and waveform of a picture signal which are input to the TFT element of a pixel SP3 located within the display area of the liquid-crystal display panel shown in FIG. 1A.
Figure 2D:
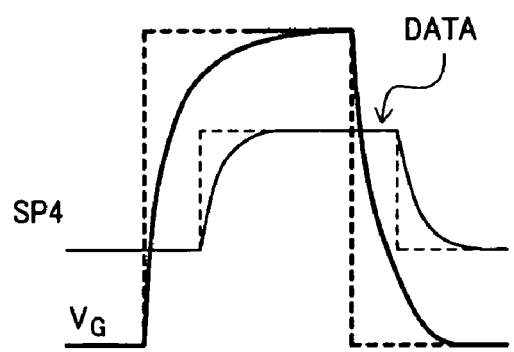
FIG. 2D is a model diagram depicting an example of a waveform of a scan signal and waveform of a picture signal which are input to the TFT element of a pixel SP4 located within the display area of the liquid-crystal display panel shown in FIG. 1A.
Figure 2E:
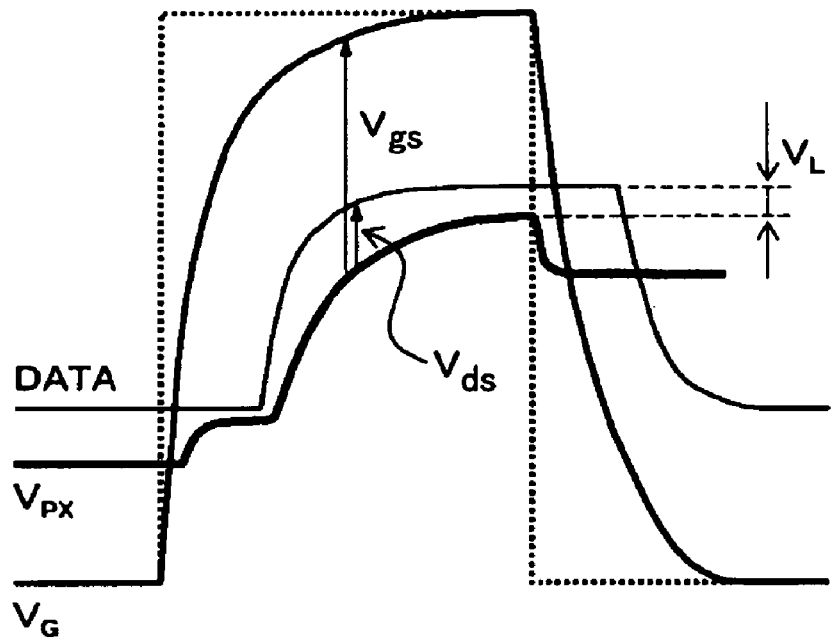
FIG. 2E is a model diagram illustrating the definition of pre-write voltage.
Figure 2F:
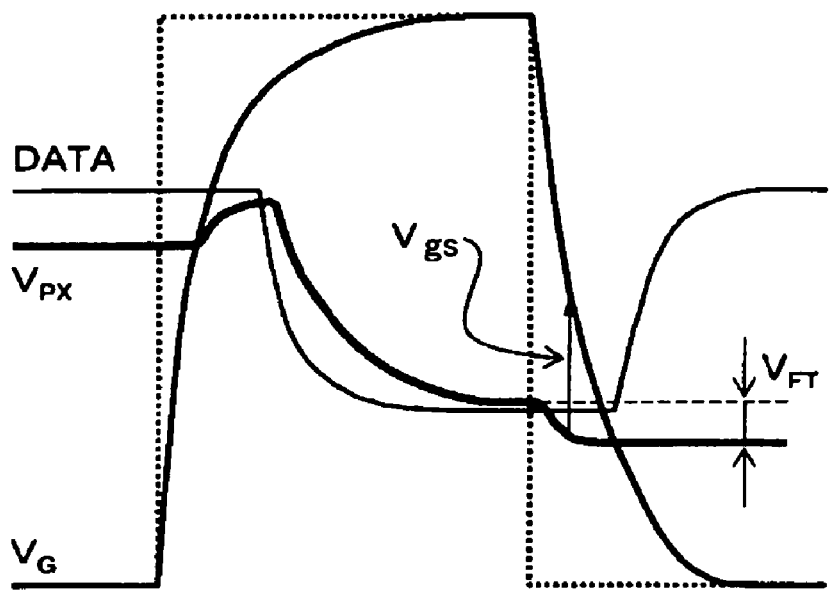
FIG. 2F is a model diagram illustrating the definition of feed-through voltage.
Figure 2G:
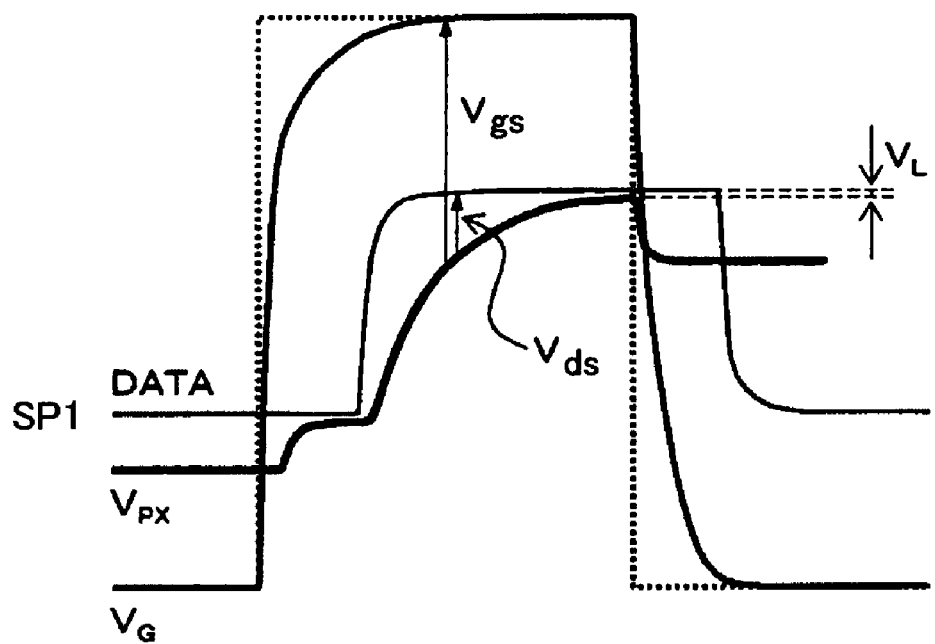
FIG. 2G is a model diagram depicting an example of pre-write voltage magnitude in the pixel SP1.
Figure 2H:
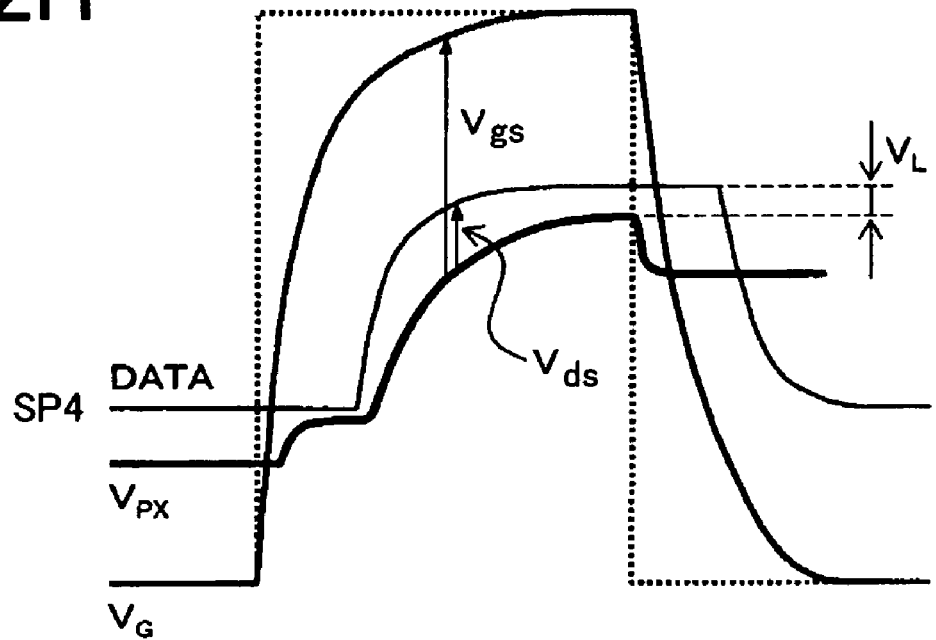
FIG. 2H is a model diagram depicting an example of pre-write voltage magnitude in the pixel SP4.
Figure 3:
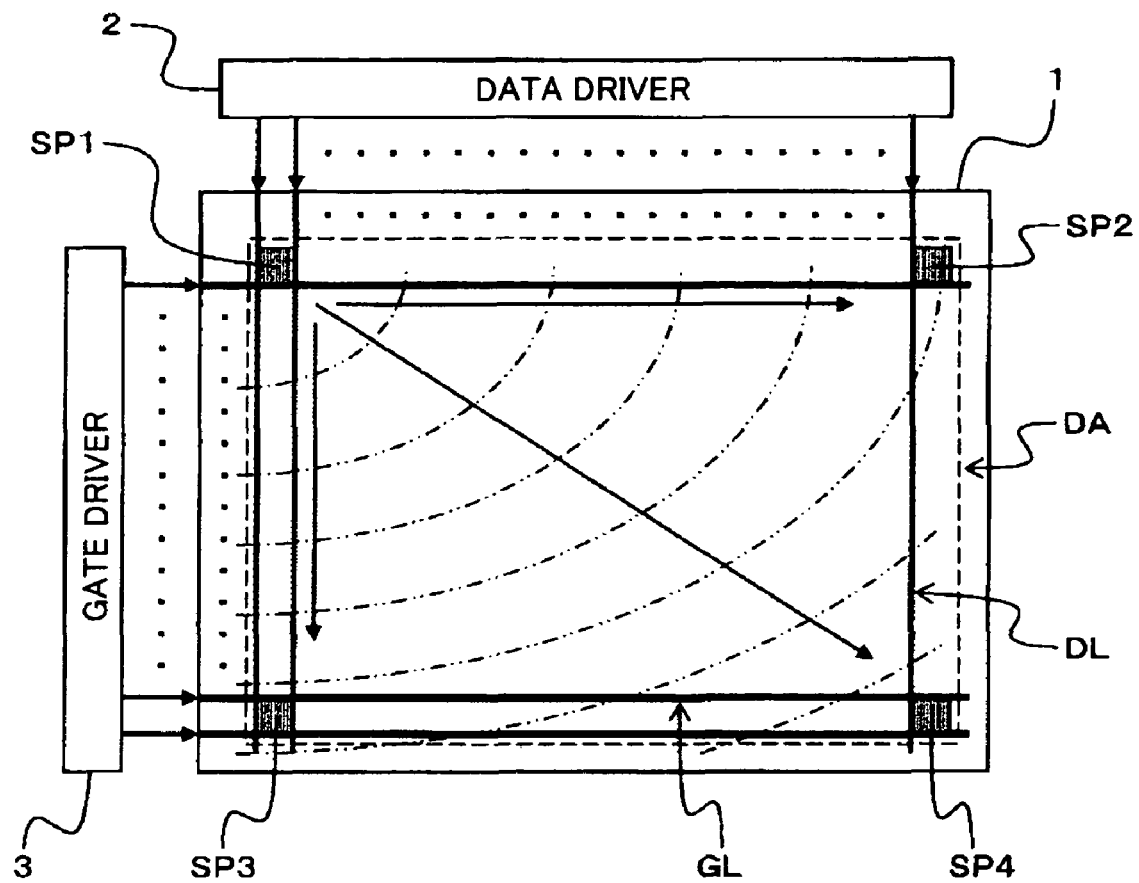
FIG. 3 is a model diagram depicting an example of the distribution of pre-write voltage magnitude in the display area of a conventional single liquid-crystal display panel.

FIG. 1A is a model diagram depicting an example of a simplified design of a liquid-crystal display device according to an embodiment of the present invention. FIG. 1B is a model diagram depicting an example of a circuit design of an individual pixel of the liquid-crystal display panel 1 shown in FIG. 1A. FIGS. 2A through 2D are model diagrams depicting an example of a waveform of a scan signal and waveform of a picture signal which are input to the respective TFT elements of pixels SP1, SP2, SP3, SP4 situated at four corners of the display area of the liquid-crystal display panel 1 shown in FIG. 1A. FIG. 2E is a model diagram illustrating the definition of pre-write voltage. FIG. 2F is a model diagram illustrating the definition of feed-through voltage. FIGS. 2G and 2H are model diagrams for the purpose of comparing pre-write voltage magnitude in the pixel SP1 or SP4. FIG. 3 is a model diagram depicting an example of the distribution of pre-write voltage magnitude in the display area of a conventional single liquid-crystal display panel.

The present invention may be implemented in, e.g., an active-matrix liquid-crystal display device. As depicted in FIG. 1A, the active matrix liquid-crystal display device will include, e.g., a liquid-crystal display panel 1 having a plurality of scan signal lines GL which extend in a first direction (the horizontal direction) and a plurality of picture signal lines DL which extend in a second direction (the vertical direction); a data driver 2 for inputting a picture signal (also called "gradation data") to the plurality of picture signal lines DL of the liquid-crystal display panel 1; a gate driver 3 for inputting a scan signal to the plurality of scan signal lines GL of the liquid-crystal display panel 1; and a common voltage input circuit 4 for inputting a voltage signal Vcom of common potential to common electrodes (not shown) of the liquid-crystal display panel 1.

In a display area DA of the liquid-crystal display panel 1, TFT elements which function as active elements (switching elements) are arranged, for example, in a matrix pattern in the aforementioned first direction and second direction. The display area DA is composed of an array of pixels arranged in a matrix pattern in the aforementioned first direction and second direction; the area occupied by an individual pixel will correspond, for example, to an area bounded by two adjacent scan signal lines GL and two adjacent picture signal lines DL.

Each of the pixels making up the display area will have a TFT element and a pixel electrode; as shown for example in FIG. 1B, in the TFT element Tr belonging to a pixel in an area bounded by two adjacent scan signal lines $GL_n$, $GL_{n+1}$ and two adjacent picture signal lines $DL_m$, $DL_{m+1}$ the gate is connected to the scan signal line $GL_{n+1}$ and the drain is connected to the picture signal line $DL_m$. The source of the TFT element Tr is connected to the pixel electrode PX of the pixel in question.

The liquid-crystal display panel 1 is a display panel in which liquid crystals have been sealed between a pair of substrates, with the scan signal lines GL, the picture signal lines DL, the TFT elements Tr, and the pixel electrodes PX being formed on one of the pair of substrates (hereinafter referred to as the TFT substrate).

The pixel electrode PX, together with the common electrode CT and the liquid crystals LC, form the pixel capacitor (liquid crystal capacitor). In respect to this point, in some instances the common electrodes CT will be formed on the TFT substrate, while in other instances they will be formed on the other substrate of the aforementioned pair of substrates (hereinafter referred to as the counter substrate).

The pixel electrode PX (not shown in the illustration in FIG. 1B) forms a holding capacitor together with, e.g., the scan signal line $GL_n$, which is the one of the two adjacent scan signal lines $GL_n$, $GL_{n+1}$ that is not connected to the gate of the TFT element Tr, and the insulating layer formed in the area of overlap between the pixel electrode PX and the scan signal line $GL_n$.

Of the various kinds of liquid-crystal display devices, in a large liquid-crystal display device such as a liquid-crystal display television, not only will the individual scan signal lines GL have considerable length in the direction in which they extend (the horizontal direction), but the individual picture signal lines DL will have considerable length in the direction in which they extend (the vertical direction) as well. For this reason, the delay level of scan signals input to the scan signal lines GL and the delay level of picture signals input to the picture signal lines DL will be greater, and differences in waveform of signals input to the TFT elements may occur between pixels at distances closer to and further away from the signal input terminals. In such instances, the waveform of the scan signal $V_G$ input to the gate and the waveform of the picture signal DATA input to the drain of the TFT elements of the pixels SP1, SP2, SP3, SP4 situated at the four corners of the display area DA shown in FIG. 1A will be as shown in FIGS. 2A through 2D, for example. In FIGS. 2A through 2D, the waveforms of the scan signal $V_G$ and of the picture signal DATA which are actually input to the TFT elements of each of the four pixels SP1, SP2, SP3, SP4 are represented by solid lines, and the ideal waveforms (input waveforms) are represented by dotted lines.

The pixel SP1 which is situated at the upper left corner of the display area DA is close to the signal input terminal of a scan signal line GL and close to the signal input terminal of a picture signal line DL. Therefore, as shown in FIG. 2A, the waveform of the scan signal $V_G$ actually input to the gate and the waveform of the picture signal DATA actually input to the drain of the TFT element of the pixel SP1 will closely resemble their respective ideal waveforms (rectangular waveforms).

The pixel SP2 which is situated at the upper right corner of the display area DA is far away from the signal input terminal of a scan signal line GL but close to the signal input terminal of a picture signal line DL. Therefore, as shown in FIG. 2B, the waveform of the picture signal DATA actually input to the drain of the TFT element of the pixel SP2 will closely resemble the ideal (rectangular) waveform, but the waveform of the scan signal $V_G$ actually input to the gate will be more corrupted than the waveform input to the TFT element of the pixel SP1, due to delay caused by line resistance. Specifically, in the waveform of the scan signal $V_G$ actually input to the gate of the TFT element of the pixel SP2, the change observed when the scan signal $V_G$ goes from Off to On and the change observed when it goes from On to Off will be more gradual than the changes observed in the scan signal $V_G$ input to the gate of the TFT element of the pixel SP1.

The pixel SP3 which is situated at the lower left corner of the display area DA is close to the signal input terminal of a scan signal line GL but far away from the signal input terminal of a picture signal line DL. Therefore, as shown in FIG. 2C, the waveform of the scan signal $V_G$ actually input to the gate of the TFT element of the pixel SP3 will closely resemble the ideal (rectangular) waveform, but the waveform of the picture signal DATA actually input to the drain will be more corrupted than the waveform input to the TFT element of the pixel SP1, due to delay caused by line resistance. Specifically, in the waveform of the picture signal DATA actually input to the drain of the TFT element of the pixel SP3, the change at the start position and the change at the end position of the picture signal DATA for the pixel SP3 will be more gradual than the changes observed in the picture signal DATA input to the drain of the TFT element of the pixel SP1.

The pixel SP4 which is situated at the lower right corner of the display area DA is far away from the signal input terminal of a scan signal line GL, and far away from the signal input terminal of a picture signal line DL. Therefore, as shown in FIG. 2D, the waveform of the scan signal $V_G$ which is actually input to the gate of the TFT element of the pixel SP4 and the waveform of the picture signal DATA will be more corrupted than the waveforms input to the TFT element of the pixel SP1, due to delay caused by line resistance on the respective lines. Specifically, in the waveform of the scan signal $V_G$ actually input to the gate of the TFT element of the pixel SP4, the change observed when the scan signal $V_G$ goes from Off to On and the change observed when the scan signal $V_G$ goes from On to Off will be more gradual than the changes observed in the scan signal $V_G$ input to the gate of the TFT element of the pixel SP1. Additionally, in the waveform of the picture signal DATA actually input to the drain of the TFT element of the pixel SP4, the change at the start position and the change at the end position of the picture signal DATA for the pixel SP4 will be more gradual than the changes observed in the picture signal DATA input to the drain of the TFT element of the pixel SP1.

While not shown in the drawings, for example, the waveform of the picture signal DATA actually input to TFT elements of pixels whose gates are connected to the scan signal line GL (namely $GL_1$) closest to the signal input terminals of the picture signal lines DL will be substantially identical to the waveform of the picture signal DATA actually input to the TFT element of the pixel SP1 and to the TFT element of the pixel SP2. However, with increasing distance from the signal input terminal of the scan signal line GL ($GL_1$), the waveform of the scan signal $V_G$ actually input to the gate of the TFT element of each of these pixels changes from the waveform of the scan signal $V_G$ input to the TFT element of the pixel SP1 to the waveform of the scan signal $V_G$ input to the TFT element of the pixel SP2. This applies to the other scan signal lines GL as well: generally, for TFT elements in which the gate is connected to a single common scan signal line GL, the waveform of the picture signal DATA input to the drain of each TFT element will be substantially identical for any of the TFT elements; but with increasing distance from the signal input terminal of the scan signal line GL, the waveform of the scan signal $V_G$ input to the gate of each TFT element will progressively fall out of alignment (corrupted) with respect to the ideal rectangular waveform.

Moreover, for TFT elements in which the drain is connected to a single common picture signal line DL, the waveform of the scan signal $V_G$ input to each of the TFT elements will be substantially identical; but with increasing distance from the signal input terminal of the picture signal line DL, the waveform of the picture signal DATA input to the drain of each TFT element will progressively fall out of alignment (corrupted) with respect to the ideal rectangular waveform.

From the preceding it will be appreciated that when any two TFT elements of the display area DA are compared, different combinations of the waveform of the scan signal $V_G$ and the waveform of the picture signal DATA which are input to the TFT elements of the pixels in the display area DA of the liquid-crystal display panel will be observed. This difference between scan signal $V_G$ waveform and picture signal DATA waveform means that bias conditions will differ for the TFT elements which charge the aforementioned pixel capacitor formed in each pixel. Due to the difference in bias conditions of individual TFT elements, pre-write voltage and feed-through voltage in individual pixels will vary as well.

Where as shown in FIG. 2E for example, the scan signal $V_G$ input to the gate of the TFT element of a given pixel has gone On, and the picture signal DATA for the pixel in question has been written to the pixel electrode PX, the pre-write voltage will be the potential difference $V_L$ between the picture signal DATA and the voltage $V_{px}$ of the pixel electrode PX at the point in time (timing) that the scan signal $V_G$ switches from On to Off. The magnitude of the pre-write voltage $V_L$ has a relationship with corruption of the waveform at the time of rise of the scan signal $V_G$ and of the picture signal DATA, and will change depending on the bias conditions $V_{gs}$, $V_{ds}$ of the TFT element, which are determined by the delay level of the scan signal $V_G$ and the delay level of the picture signal DATA. In this regard, since the On current of TFT element will drop in association with progressively greater delay (waveform corruption) of the scan signal $V_G$ and of the picture signal DATA, the pre-write voltage $V_L$ will progressively increase in pixels further away from the signal input terminals of the scan signal lines GL and further away from the signal input terminals of the picture signal lines DL.

Meanwhile, where as shown in FIG. 2F for example, the scan signal $V_G$ input to the gate of the TFT element of a given pixel has gone On, and the picture signal DATA for the pixel in question has been written to the pixel electrode PX, the feed-through voltage will be the potential difference $V_{FT}$ between the voltage $V_{px}$ of the pixel electrode PX at the point in time (timing) that the scan signal $V_G$ switches from On to Off, versus the voltage $V_{px}$ of the pixel electrode PX after the switch. The feed-through voltage $V_{FT}$ has a relationship with corruption of the waveform at the time of fall of the scan signal $V_G$ (i.e. when the scan signal $V_G$ switches from On to Off) and will change depending on the bias condition $V_{gs}$ of the TFT element, which is determined by the delay level of the scan signal $V_G$. In this regard, since recharging (overcharging) of TFT element by the On current will increase in association with progressively greater delay of the scan signal $V_G$, the feed-through voltage $V_{FT}$ will be progressively smaller in pixels further away from the signal input terminals of the scan signal lines GL.

As will be apparent from the above, with regard to change observed in the pre-write voltage $V_L$ and the feed-through voltage $V_{FT}$ occurring in the individual pixels for the two pixels SP1, SP4 shown in FIG. 1A for example, change in the pre-write voltage $\Delta V_L$ will take place for example as depicted in FIGS. 2G and 2H. For the pixel SP1 which is closest to the signal input terminal of a scan signal line GL and to the signal input terminal of a picture signal line DL, both the scan signal $V_G$ and the picture signal DATA input to the TFT element will have a sharp waveform at the time the signal rises, and the pre-write voltage $V_L$ will be small. On the other hand, for the pixel SP4 which is furthest away from the signal input terminal of a scan signal line GL and from the signal input terminal of a picture signal line DL, both the scan signal $V_G$ and the picture signal DATA input to the TFT element will have a corrupted waveform at the time the signal rises, and the pre-write voltage $V_L$ will be large.

Considering the display area DA as a whole, the magnitude of the pre-write voltage $V_L$ in individual pixels will be distributed as shown by the double-dot and dashed lines in FIG. 3, for example, with the pre-write voltage $V_L$ being smallest in the pixel SP1 which is closest to the signal input terminal of a scan signal line and to the signal input terminal of a picture signal line, and becoming progressively larger in pixels further away from the pixel SP1.

An example of a liquid-crystal display panel design for minimizing the change in the pre-write voltage $V_L$ and feed-through voltage $V_{FT}$ in individual pixels will be described below.

Embodiment 1

Figure 4:
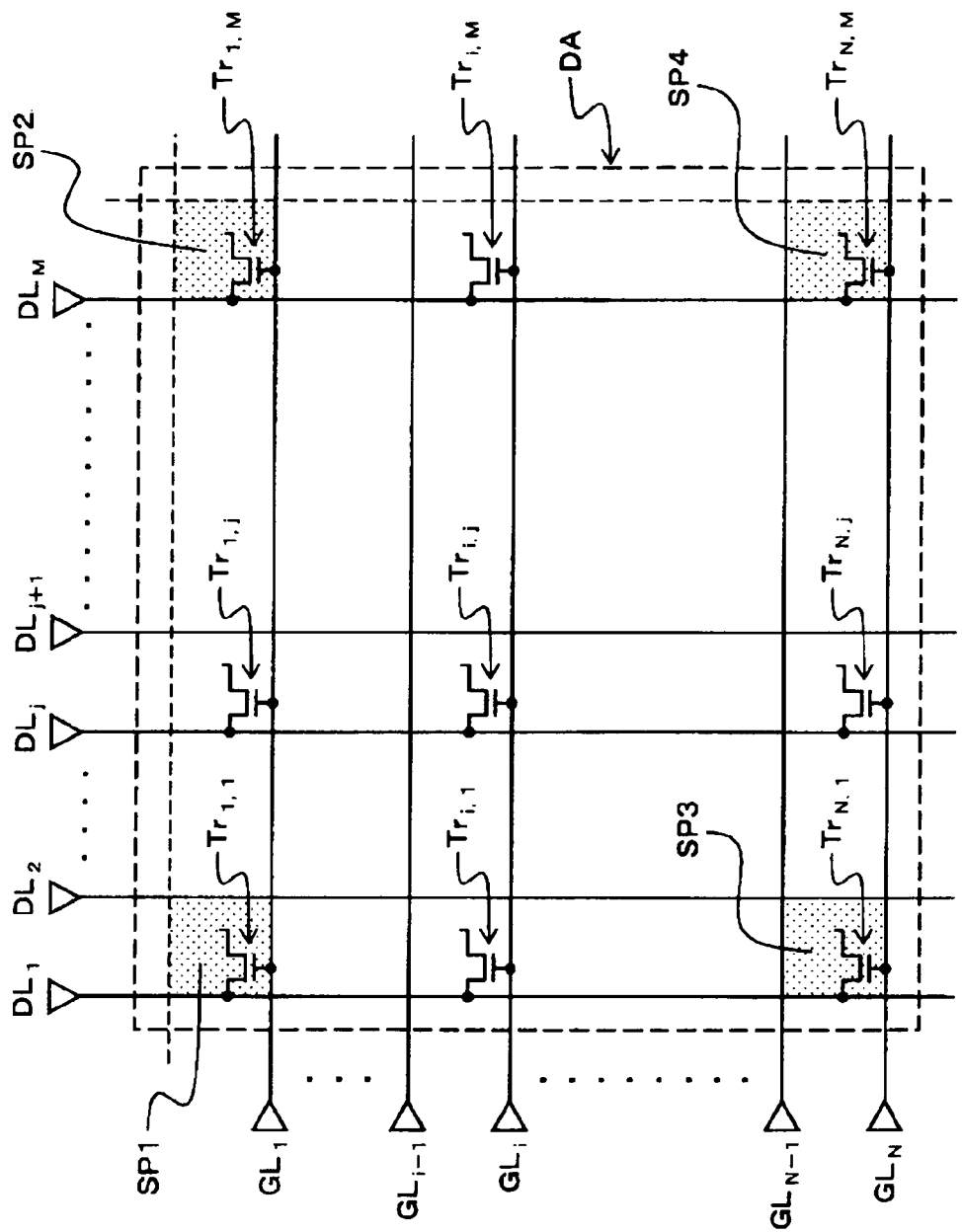
FIG. 4 is a model circuit diagram depicting an example of a simplified design of a liquid-crystal display panel according to Embodiment 1.

FIG. 4 is a model circuit diagram depicting an example of a simplified design of a liquid-crystal display panel according to Embodiment 1.

As shown in FIG. 4, in the liquid-crystal display panel according to Embodiment 1, the plurality of TFT elements Tr arranged in matrix form in the display area DA are distinguished using the notation $Tr_{n,m}$. The subscript "n" of $Tr_{n,m}$ is any one of a number of integers $1, 2, \ldots i, \ldots N$, and denotes the scan signal line $GL_n$ to which the gate is connected. The subscript "m" of $Tr_{n,m}$ is any one of a number of integers $1, 2, \ldots j, \ldots M$, and denotes the picture signal lines DL, to which the drain is connected.

In FIG. 4, the triangular symbols at the left ends of the scan signal lines $GL_1, GL_{i-1}, GL_i, GL_{N-1}, GL_N$ denote signal input terminals for scan signals, while the triangular symbols at the upper ends of the picture signal lines $DL_1, DL_2, DL_j, DL_{j+1}, DL_M$ denote signal input terminals for picture signals.

Individual TFT elements Tr in which the gate is connected, for example, to the scan signal line $GL_1$ will be denoted as $Tr_{1,1}, Tr_{1,2}, \ldots Tr_{1,j}, \ldots, Tr_{1,M}$ in order from the TFT element closest to the signal input terminal of the scan signal line $GL_1$. That is, TFT elements Tr in which the gate is connected to a given single common scan signal line $GL_n$ will be denoted as $Tr_{n,1}, Tr_{n,2}, \ldots Tr_{n,j}, \ldots Tr_{n,M}$ in order from the TFT element closest to the signal input terminal of the scan signal line $GL_n$.

In the liquid-crystal display panel according to Embodiment 1, for individual TFT elements ($Tr_{n,1}, Tr_{n,2}, \ldots Tr_{n,j}, \ldots Tr_{n,M}$) in which the gate is connected to a single scan signal line $GL_n$, first, the channel width W, the channel length L, and the size (i.e., the value W/L (which is the channel width W divided by the channel length L)) in the TFT elements will be set independently on an individual basis for the TFT elements in the manner shown in Table 1, for example. Here, channel width $W_{n,m}$ and channel length $L_{n,m}$ of individual TFT elements ($Tr_{n,m}$ (m=1, 2, ..., j, ... M)) will be set, for example, such that the value of channel width divided by channel length ($W_{n,m}/L_{n,m}$) becomes progressively higher in TFT elements further away from the signal input terminal of the scan signal line $GL_n$.

TABLE 1

|  | W | L | W/L |
| --- | --- | --- | --- |
| $Tr_{n,1}$ | $W_{n,1}$ | $L_{n,1}$ | $W_{n,1}/L_{n,1}$ |
| $Tr_{n,2}$ | $W_{n,2}$ | $L_{n,2}$ | $W_{n,2}/L_{n,2}$ |
| . | . | . | . |
| . | . | . | . |
| $Tr_{n,j}$ | $W_{n,j}$ | $L_{n,j}$ | $W_{n,j}/L_{n,j}$ |
| . | . | . | . |
| . | . | . | . |
| $Tr_{n,M}$ | $W_{n,M}$ | $L_{n,M}$ | $W_{n,M}/L_{n,M}$ |

TFT elements ($Tr_{n,m}$ (m=1, 2, ..., j, ... M)) in which the gate is connected to a single common scan signal line $GL_n$ will accordingly have progressively a smaller TFT element size (W/L) and a lower switching capability in those TFT elements which are shorter distances away from the signal input terminal of the scan signal line $GL_n$. Specifically, write current values for TFT elements closer to the signal input terminal of the scan signal line $GL_n$ will be smaller than write current values for TFT elements further away from the signal input terminal of the scan signal line $GL_n$. For this reason, it is possible to achieve smaller variation in the magnitude of the pre-write voltage $V_L$ in individual pixels having TFT elements ($Tr_{n,m}$ (m=1, 2, ..., j, ... M)) in which the gate is connected to the scan signal line $GL_n$.

Moreover, when setting the TFT element size (W/L) of TFT elements ($Tr_{n,m}$ (m=1, 2, ..., j, ... M)) in which the gate is connected to a single common scan signal line $GL_n$, the employing of a design whereby, for example, the size of the TFT element becomes progressively smaller going towards the signal input terminal with regard to a benchmark size $W_{n,M}/L_{n,M}$ established for the TFT element furthest away from the signal input terminal of the scan signal line $GL_n$ makes it possible to reduce parasitic capacitance (also known as line capacitance) in pixels whose TFT elements are closer to the signal input terminal of the scan signal line $GL_n$. For this reason, it will be possible to reduce variability in the magnitude of the feed-through voltage $V_{FT}$ in pixels having TFT elements ($Tr_{n,m}$ (m=1, 2, ..., j, ... M)) in which the gate is connected to a single common scan signal line $GL_n$.

Furthermore, in the liquid-crystal display panel according to Embodiment 1, for the TFT elements ($Tr_{1,m}, Tr_{2,m}, \ldots, Tr_{i,m}, \ldots, Tr_{N,m}$) in which the drain is connected to a single common picture signal line $DL_m$ as well, the channel width W, the channel length L, and the size (the value W/L (channel width divided by channel length)) in each TFT element will be set on an individual TFT element basis in the manner depicted in Table 2 below, for example. Here, channel width $W_{n,m}$ and channel length $L_{n,m}$ of individual TFT elements ($Tr_{n,m}$ (n=1, 2, ..., i, ... N)) will be set, for example, such that the value of channel width divided by channel length ($W_{n,m}/$ $L_{n,m}$) becomes progressively higher in TFT elements further away from the signal input terminal of the picture signal line $GL_m$.

TABLE 2

|  | W | L | W/L |
|---|---|---|---|
| $Tr_{1,m}$ | $W_{1,m}$ | $L_{1,m}$ | $W_{1,m}/L_{1,m}$ |
| $Tr_{2,m}$ | $W_{2,m}$ | $L_{2,m}$ | $W_{2,m}/L_{2,m}$ |
| . | . | . | . |
| . | . | . | . |
| . | . | . | . |
| $Tr_{i,m}$ | $W_{i,m}$ | $L_{i,m}$ | $W_{i,m}/L_{i,m}$ |
| . | . | . | . |
| . | . | . | . |
| . | . | . | . |
| $Tr_{N,m}$ | $W_{N,m}$ | $L_{N,m}$ | $W_{N,m}/L_{N,m}$ |

The TFT elements ($Tr_{n,m}$ (n=1, 2, . . . , . . . N)) in which the drain is connected to a single common picture signal line $DL_m$ will accordingly have progressively smaller TFT element size (W/L) and reduced switching capability in those TFT elements which are shorter distances away from the signal input terminal of the picture signal line $DL_m$. Specifically, write current values for TFT elements closer to the signal input terminal of the picture signal line $DL_m$ will be smaller than write current values for TFT elements further away from the signal input terminal of the picture signal line $DL_m$. It will accordingly be possible to achieve smaller variation in magnitude of the pre-write voltage $V_L$ in individual pixels having TFT elements ($Tr_{n,m}$ (n=1, 2, . . . , j, . . . N)) in which the drain is connected to the picture signal line $DL_m$.

Figure 5A:
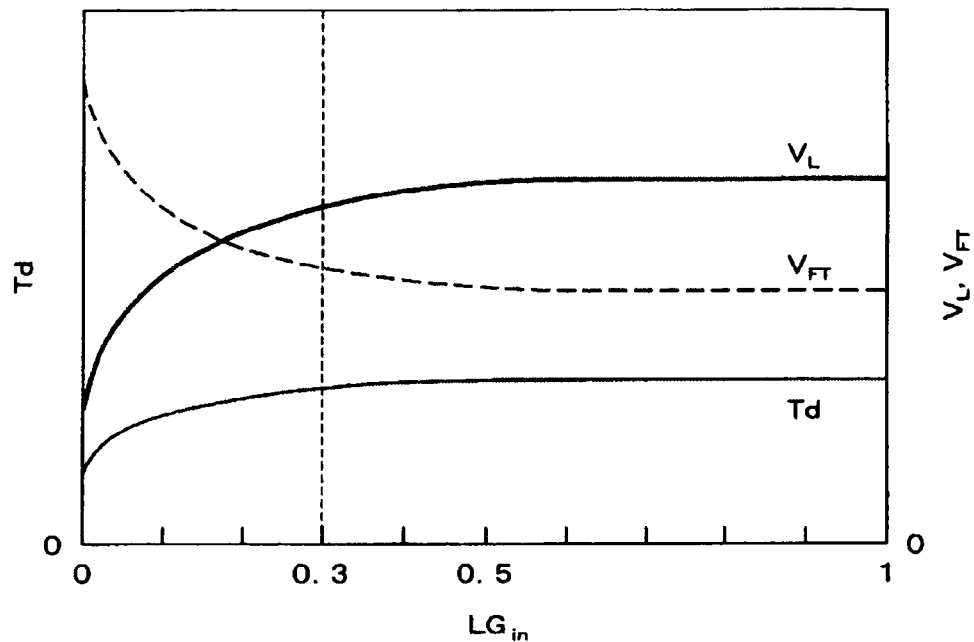
FIG. 5A is a model graph showing relationships between delay level, pre-write voltage, and feed-through voltage to distance from the signal input terminal of a single scan signal line in a conventional liquid-crystal display panel.
Figure 5B:
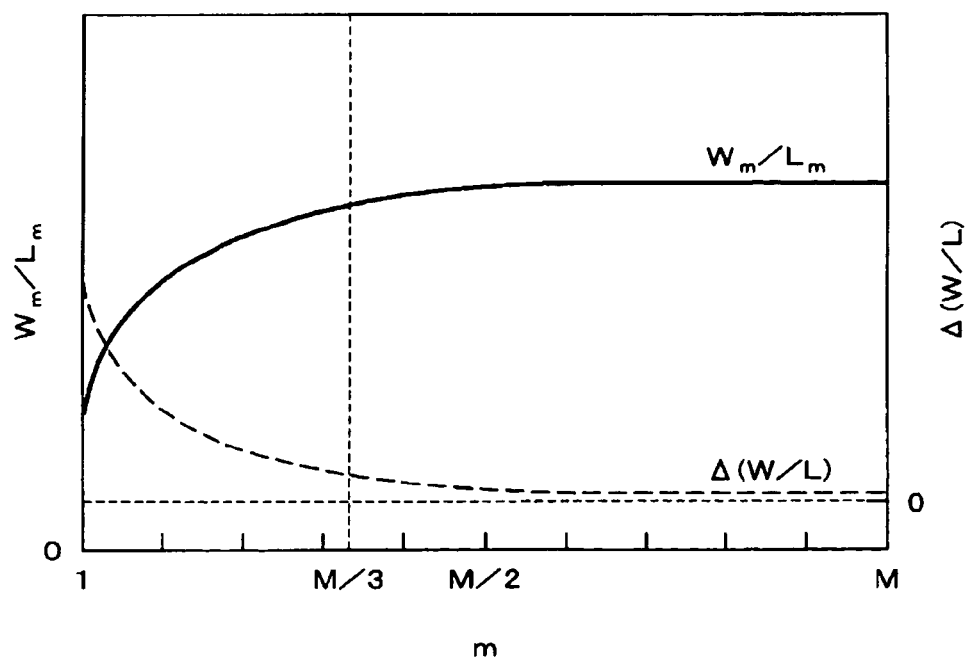
FIG. 5B is a model graph depicting an example of a method for setting the size (W/L) of TFT elements connected to a single common scan signal line in the liquid-crystal display panel according to Embodiment 1.
Figure 6A:
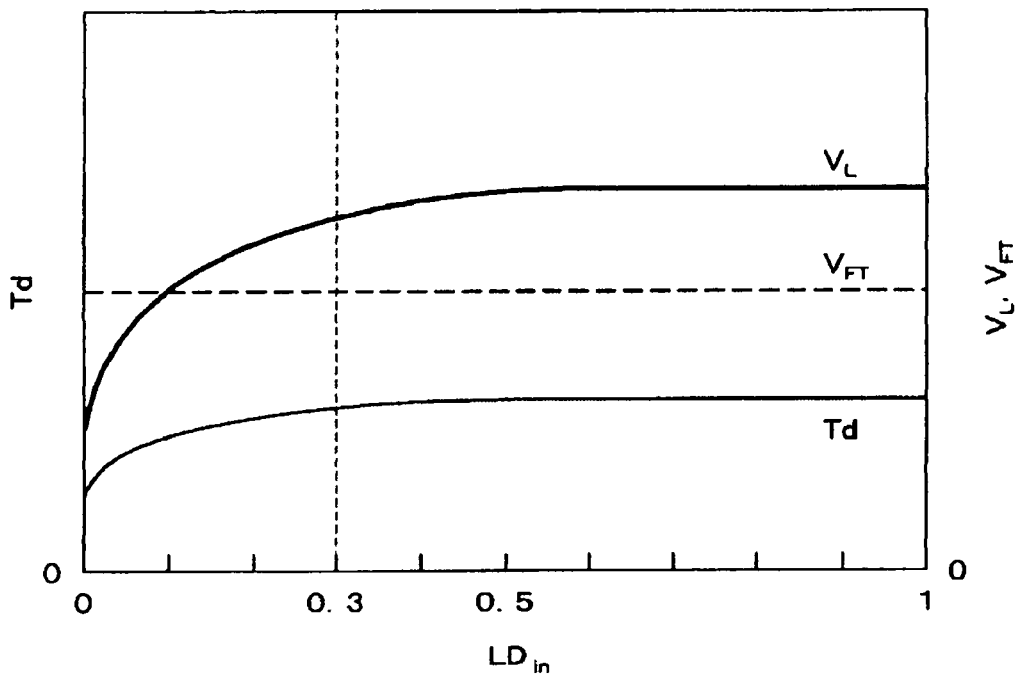
FIG. 6A is a model graph showing relationships of delay time, pre-write voltage, and feed-through voltage to distance from the signal input terminal of a single picture signal line in a conventional liquid-crystal display panel.
Figure 6B:
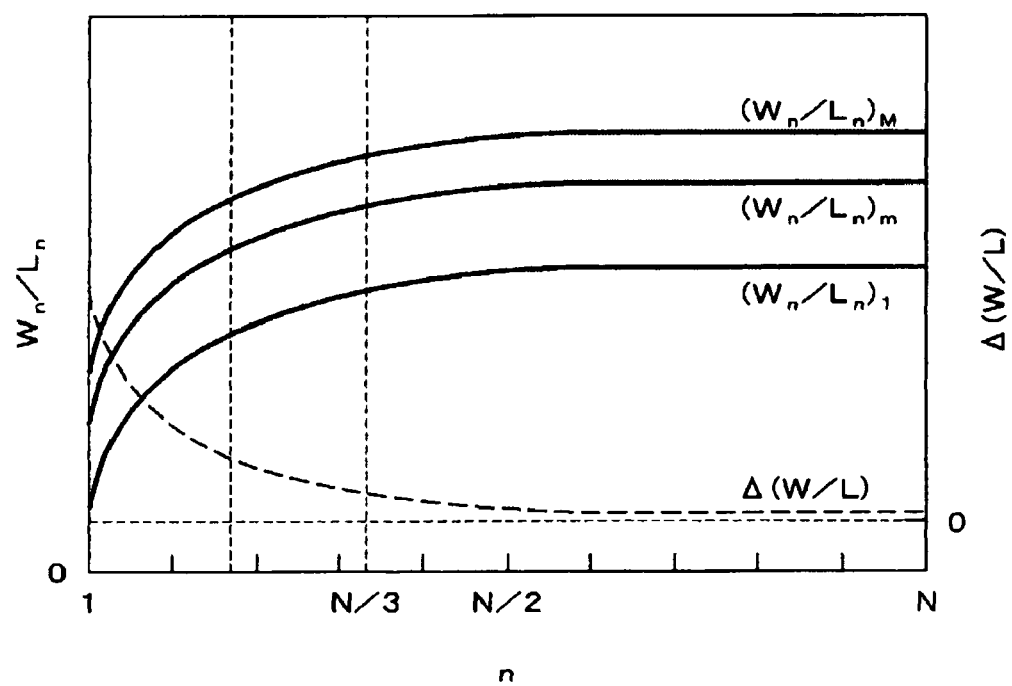
FIG. 6B is a model graph depicting an example of a method for setting the size (W/L) of TFT elements connected to a single common picture signal line in the liquid-crystal display panel according to Embodiment 1.

FIG. 5A is a model graph showing relationships of delay level, pre-write voltage, and feed-through voltage to distance from the signal input terminal of a single scan signal line in a conventional liquid-crystal display panel. FIG. 5B is a model graph depicting an example of a method for setting the size (W/L) of TFT elements connected to a single common scan signal line in the liquid-crystal display panel according to Embodiment 1. FIG. 6A is a model graph showing relationships of delay time, pre-write voltage, and feed-through voltage to distance from the signal input terminal of a single picture signal line in a conventional liquid-crystal display panel. FIG. 6B is a model graph depicting an example of a method for setting the size (W/L) of TFT elements connected to a single common picture signal line in the liquid-crystal display panel according to Embodiment 1.

In the liquid-crystal display panel according to Embodiment 1, with particular note to TFT elements in which, the gate is connected to a given single common scan signal line $GL_n$ for example, progressively increasing the size (e.g. W/L) of the TFT elements for TFT elements further away from the signal input terminal of the scan signal line $GL_n$ will cause the magnitude of the pre-write voltage $V_L$ and of the feed-through voltage $V_{FT}$ to be substantially identical in individual pixels with TFT elements in which the gate is connected to a given single common scan signal line $GL_n$.

An examination of the relationship between distance from the signal input terminal of a single scan signal line $GL_n$ and the delay level of the scan signal $V_G$ input to the scan signal line $GL_n$ reveals a relationship such as is depicted in FIG. 5A for example. The horizontal axis of the graph shown in FIG. 5A gives a relative distance $LG_{in}$ from the signal input terminal and represents, for example, the distance from the signal input terminal to each TFT element where a value of 1 has been assigned to the distance from the signal input terminal to the connection location of the gate of the TFT element of the pixel furthest away from the signal input terminal. The vertical axis at left gives the delay level Td; going upward, the delay level becomes higher and the waveform more corrupted. Here, with regard to the delay level Td on the scan signal line $GL_n$, upon reaching a threshold in proximity to a relative distance $LG_{in}$ of 0.3 from the signal input terminal, for example, the level of change in the delay level among pixels at relative distance $LG_{in}$ shorter (smaller) than 0.3 will differ from the level of change among pixels [at relative distance] longer than 0.3, with the level of change being greater among pixels at relative distance $LG_{in}$ shorter than 0.3.

Furthermore, when the relationship between the magnitude of the pre-write voltage $V_L$ and the magnitude of the feed-through voltage $V_{FT}$ of individual pixels in an instance where TFT elements in which the gate is connected to a scan signal line $GL_n$ are substantially identical in size (W/L) is overlaid on the relationship between the delay level Td and the relative distance $LG_{in}$ from the signal input terminal of the scan signal line $GL_n$, the relationship will be as shown in FIG. 5A for example. In the graph of FIG. 5A, the vertical axis on the right side gives the pre-write voltage $V_L$ (or feed-through voltage $V_{FT}$) of each pixel, with the voltage $V_L$, $V_{FT}$ becoming greater going upward. In this way, in a typical conventional liquid-crystal display panel, the pre-write voltage $V_L$ will increase and the feed-through voltage $V_{FT}$ value will decrease as the relative distance $LG_{in}$ from the signal input terminal of the scan signal line $GL_n$ becomes progressively greater. As with the delay level Td, the level of change in the pre-write voltage $V_L$ and the feed-through voltage $V_{FT}$ will be greater among pixels at a relative distance $LG_{in}$ that is less than 0.3.

When setting the size (W/L) of a plurality of TFT elements in which the gate is connected to a single common scan signal line $GL_n$, the relationship between the distance (location) from the signal input terminal of the scan signal line $GL_n$ to the difference Δ(W/L) in size W/L between two neighboring TFT elements is preferably as shown in the graph of FIG. 5B, for example. In the graph of FIG. 5B, the horizontal axis gives the subscript "m" assigned to the picture signal lines $DL_m$ to which the drains of the TFT elements are connected; m assumes values of 1, 2, . . . , M in order starting from the picture signal line closest to the signal input terminals of the scan signal lines $GL_n$. The vertical axis on the left side gives the size ($W_{n,m}/L_{n,m}$) of the TFT elements $Tr_{n,m}$; and the vertical axis on the right side gives $\Delta(W/L)=(W_{n,m}/L_{n,m})-((W_{n,m-1}/L_{n,m-1})$. On both the left vertical axis and the right vertical axis, the respective values increase going upward.

Where there are M picture signal lines DL intersecting a single scan signal line $GL_n$, then in a manner reflecting the relationships among the relative distance $LG_{in}$ from the signal input terminal, the delay level Td, the pre-write voltage $V_L$, and the feed-through voltage $V_{FT}$ shown in FIG. 5A, upon reaching the TFT element in which the drain is connected to the picture signal line $DL_{M/3}$ for example, the level of change in size Δ(W/L) in TFT elements in which the drain is connected to the picture signal lines $DL_1$ through $DL_{M/3}$ will then become greater than the level of change in size Δ(W/L) in TFT elements in which the drain is connected to the picture signal lines $DL_{(M/3)+1}$ through $DL_M$. It will accordingly be possible to produce substantially identical values for the pre-write voltage $V_L$ and the feed-through voltage $V_{FT}$ in pixels having TFT elements in which the gate is connected to a single scan signal line $GL_n$. It shall be apparent that when M/3 is not an integer, the level of change in size Δ(W/L) of the TFT elements may be changed upon reaching a picture signal line DL which is assigned an integral value close to M/3.

An examination of the relationship between the distance from the signal input terminal of a single picture signal line $DL_m$ and the delay level of the picture signal DATA input to the picture signal line $DL_m$ reveals a relationship like that depicted in FIG. 6A, for example. The horizontal axis of the graph shown in FIG. 6A gives the relative distance $LD_{in}$ from the signal input terminal and represents, for example, the distance from the signal input terminal to each TFT element where a value of 1 has been assigned to the distance from the signal input terminal to the connection location of the drain of the TFT element of the pixel furthest away from the signal input terminal. The vertical axis at left gives the delay level Td; going upward, the delay level becomes higher and the waveform more corrupted. Here, with regard to the delay level Td on the picture signal line $DL_m$, upon reaching a threshold in proximity to a relative distance $LD_{in}$ of 0.3 from the signal input terminal for example, the level of change in the delay level among pixels at a relative distance $LD_{in}$ shorter (smaller) than 0.3 becomes different from the level of change among pixels at a relative distance of longer than 0.3, with the delay level being greater among pixels at a relative distance $LD_{in}$ of less than 0.3.

Furthermore, when the relationship between the magnitude of the pre-write voltage $V_L$ and the magnitude of the feed-through voltage $V_{FT}$ of individual pixels in an instance where TFT elements in which the drain is connected to a picture signal line $DL_m$ are substantially identical in size (W/L) is overlaid on the relationship between the delay level Td and the relative distance $LD_{in}$ from the signal input terminal of the picture signal line $DL_m$, the relationship will be as shown in FIG. 6A for example. In the graph of FIG. 6A, the vertical axis on the right side gives the pre-write voltage $V_L$ (or feed-through voltage $V_{FT}$) of each pixel, with the voltage $V_L$, $V_{FT}$ becoming greater going upward. Thus, in a typical conventional liquid-crystal display panel, with a progressively longer (greater) relative distance $LD_{in}$ from the signal input terminal of the scan signal line $DL_n$, the pre-write voltage $V_L$ will increase, while the feed-through voltage $V_{FT}$ value will remain substantially constant. As with the delay level Td, the level of change in the pre-write voltage $V_L$ will be greater among pixels at relative distance $LD_{in}$ shorter (smaller) than 0.3.

When setting the size (W/L) of a plurality of TFT elements in which the drain is connected to a single common picture signal line $DL_m$, the relationship between the distance (location) from the signal input terminal of the picture signal line $DL_m$ to the difference $\Delta$(W/L) in size W/L between two neighboring TFT elements will preferably be as shown in the graph of FIG. 6B, for example. In the graph of FIG. 6B, the horizontal axis gives the subscript "n" assigned to the scan signal lines $GL_n$ to which the gates of the TFT elements are connected; n assumes values of 1, 2, . . . , N in order starting from the scan signal line closest to the signal input terminals of the picture signal lines $DL_m$. The vertical axis on the left side gives the size ($W_{n,m}/L_{n,m}$) of the TFT elements $Tr_{n,m}$; and the vertical axis on the right side gives $\Delta$(W/L)=($W_{n,m}/L_{n,m}$)−(($W_{n-1,m}/L_{n-1,m}$). On both the left vertical axis and the right vertical axis, the respective values increase going upward.

Here, where there are N picture signal lines GL intersecting a picture signal line $DL_m$, then in a manner reflecting the relationships among the relative distance $LD_{in}$ from the signal input terminal, the delay level Td, and the pre-write voltage $V_L$ shown in FIG. 6A, upon reaching the TFT element in which the gate is connected to the scan signal line $GL_{N/3}$ for example, the level of change in size $\Delta$(W/L) in TFT elements in which the gate is connected to the scan signal lines $GL_1$ through $GL_{N/3}$ will then become greater than the level of change in size $\Delta$(W/L) in TFT elements in which the gate is connected to the scan signal lines $GL_{(N/3)+1}$ through $GL_N$. It will accordingly be possible to produce substantially identical values of the pre-write voltage $V_L$ in pixels having TFT elements in which the drain is connected to a common picture signal line $DL_m$. It shall be apparent that when N/3 is not an integer, the level of change in size $\Delta$(W/L) of the TFT elements may be changed upon reaching a scan signal line GL which is assigned an integral value close to N/3.

When the size (W/L) of TFT elements in which the drain is connected to a single common picture signal line $DL_m$ is set according to the approach illustrated in FIGS. 6A and 6B, it will be necessary to take into account the distance of the picture signal lines $DL_m$ from the signal input terminals of the scan signal lines GL. For TFT elements in which the gate is connected to a single common scan signal line $GL_i$, it will be necessary for their size (W/L) to have a distribution (relationship) like that shown in FIG. 5B for example. Specifically, it will be necessary for the size of a TFT element $Tr_{i,1}$ in which the gate is connected to the scan signal line $GL_i$ and the drain connected to the picture signal line $DL_1$, the size of a TFT element $Tr_{i,j}$ in which the gate is connected to the scan signal line $GL_i$ and the drain connected to the picture signal line $DL_j$, and the size of a TFT element $Tr_{i,M}$ in which the gate is connected to the scan signal line $GL_i$ and the drain connected to the picture signal line $DL_M$ to have a relationship in accordance with a distribution like that shown in FIG. 5B. For this reason, when setting the size (W/L) of TFT elements in which the drain is connected to a single common picture signal line $DL_m$, the size of the TFT element in which the drain is connected to the picture signal line $DL_1$, the size of the TFT element in which the drain is connected to the picture signal line $DL_j$, and the size of the TFT element in which the drain is connected to the picture signal line $DL_M$ will be set to respectively different values in the manner depicted for example in FIG. 6B, with the size becoming progressively larger for TFT elements in which the drain is connected to picture signal lines situated farther away from the signal input terminals of the scan signal lines GL.

In the liquid-crystal display panel according to Embodiment 1, for the TFT elements in a matrix arrangement in the display area DA, setting the size (the value W/L (channel width W divided by channel length L)) of the TFT elements on an individual basis for each TFT element using a method such as that described above for example makes it possible to produce substantially identical values for the pre-write voltage $V_L$ and feed-through voltage $V_{FT}$ in each pixel of the display area DA of a single liquid-crystal display panel, and to reduce irregular luminance and flicker.

Figure 7A:
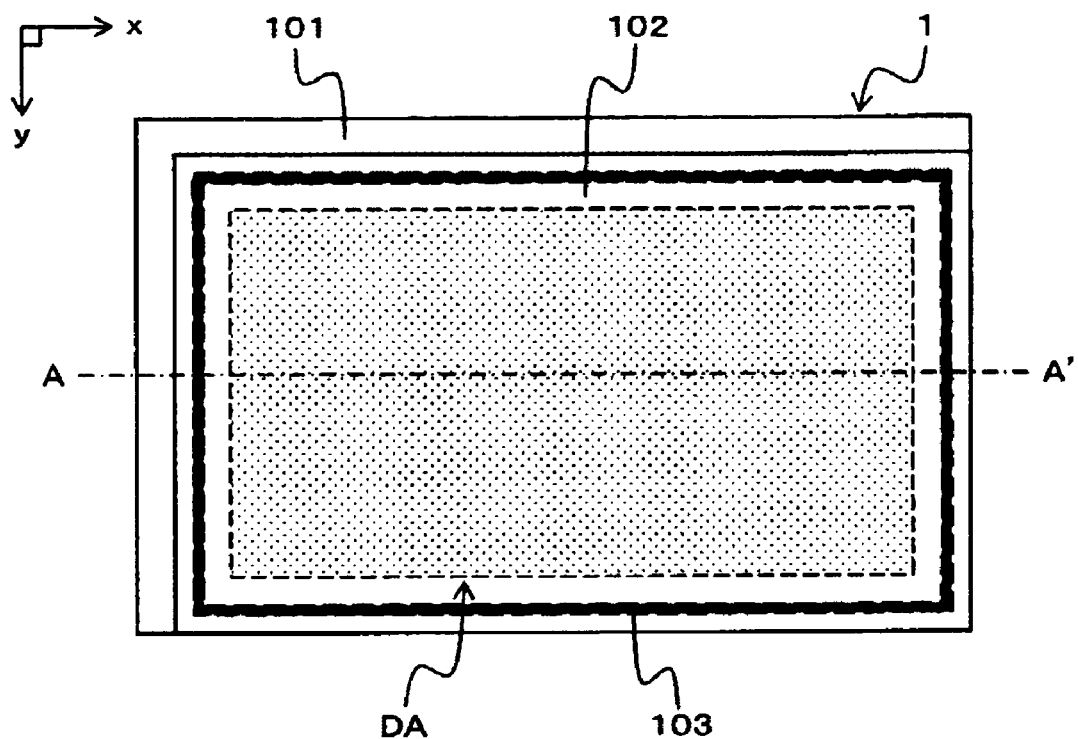
FIG. 7A is a model plan view depicting a simplified design of a liquid-crystal display panel.
Figure 7B:
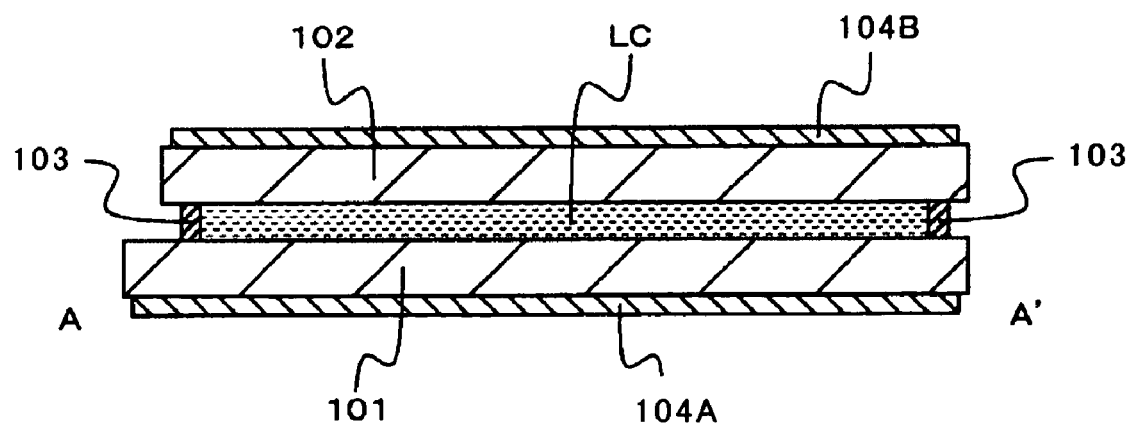
FIG. 7B is a model sectional view taken along line A-A' in FIG. 7A.
Figure 8A:
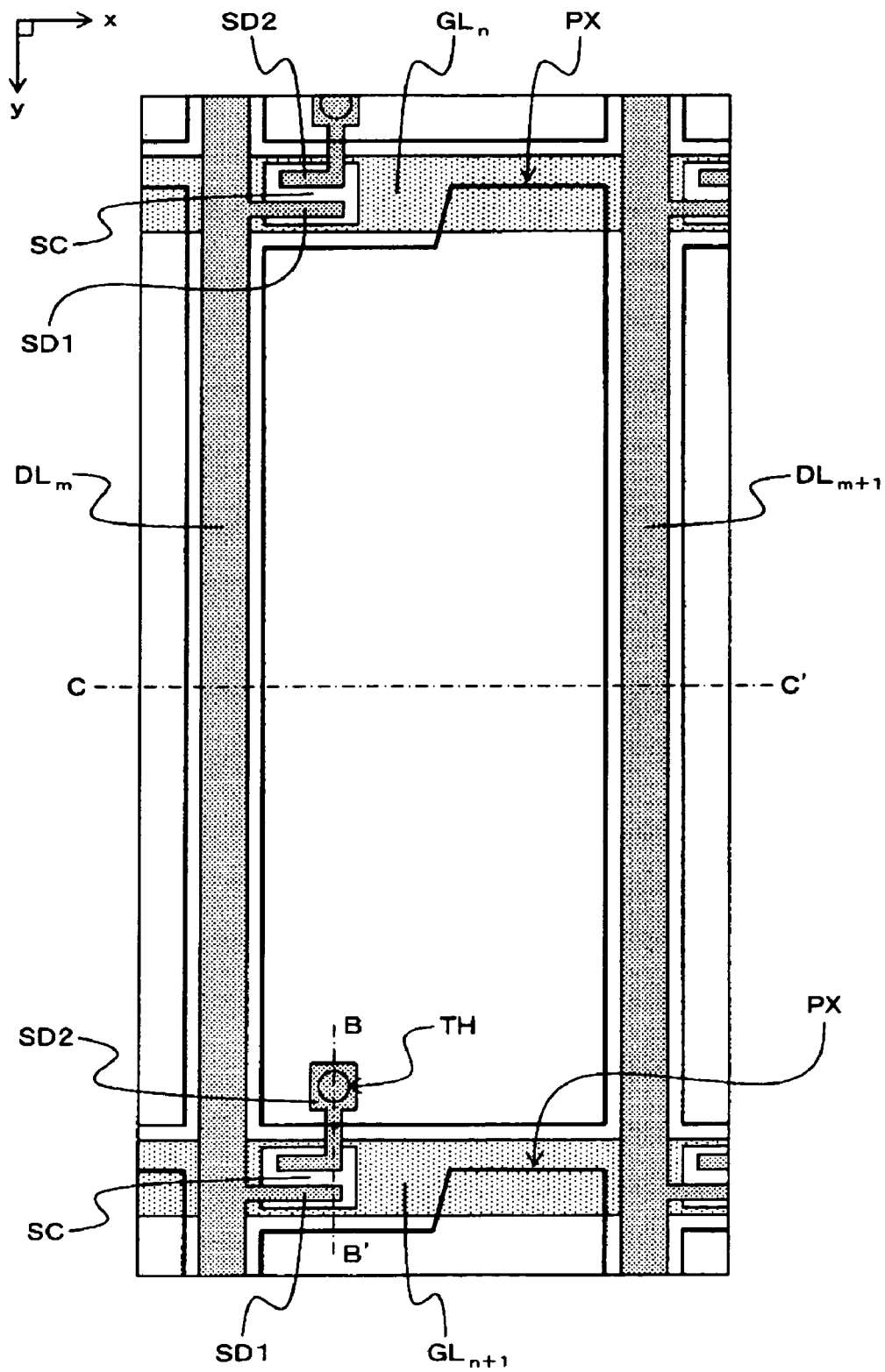
FIG. 8A is a model plan view depicting an example of a simplified design of an individual pixel on the TFT substrate of a liquid-crystal display panel.
Figure 8B:
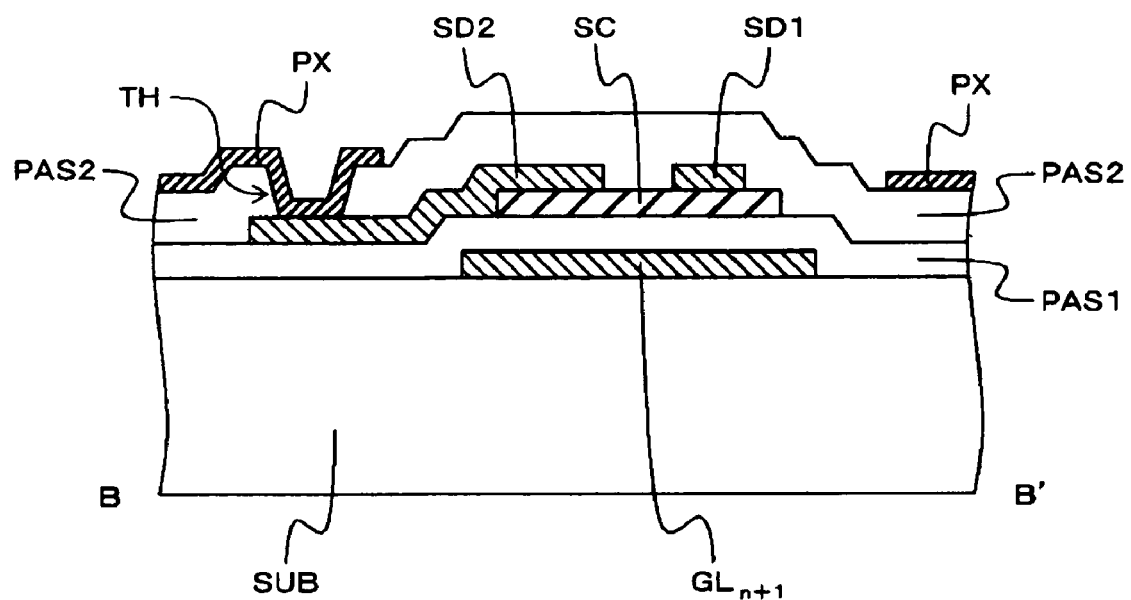
FIG. 8B is a model sectional view taken along line B-B' in FIG. 8A.
Figure 8C:
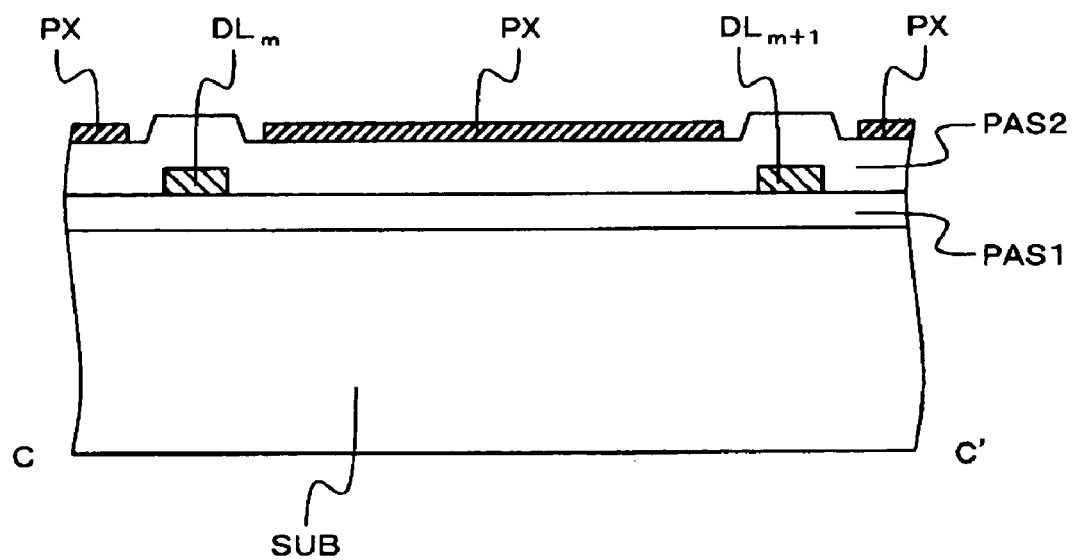
FIG. 8C is a model sectional view taken along line C-C' in FIG. 8A.
Figure 9A:
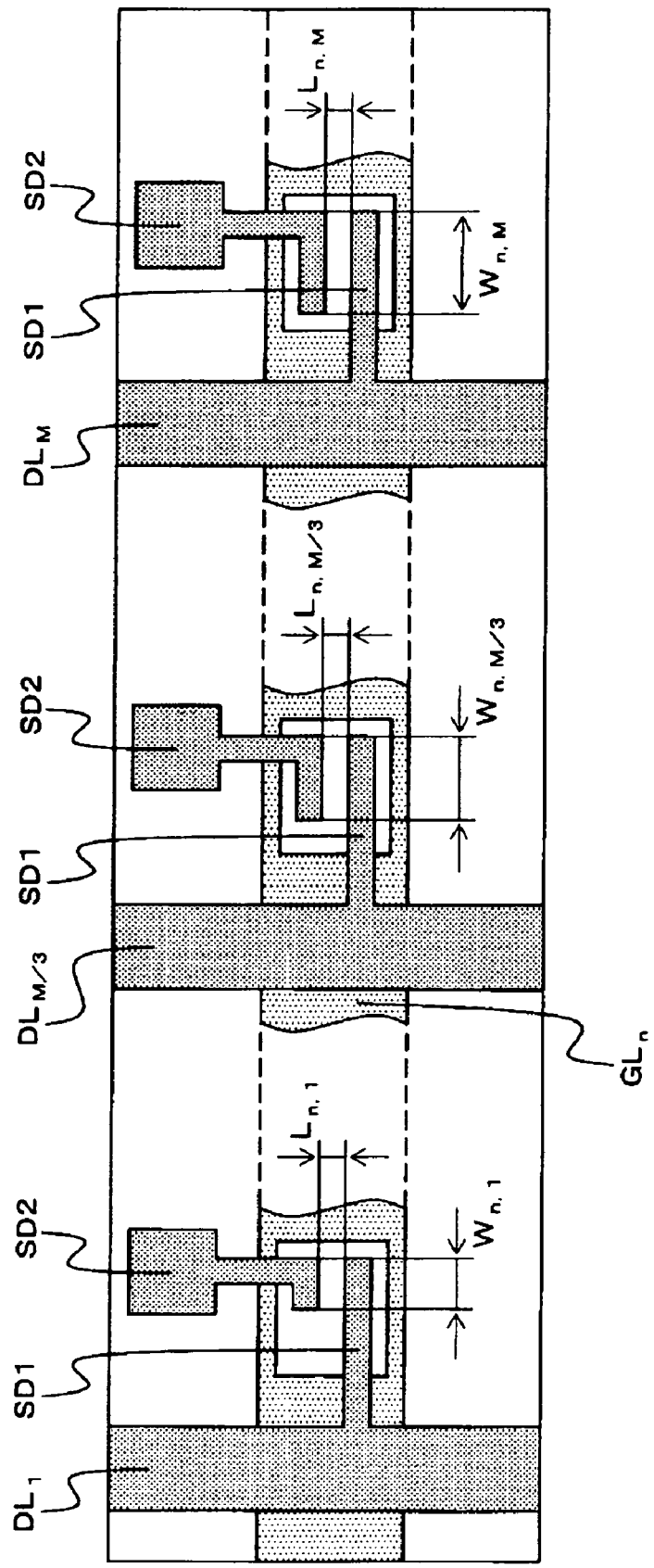
FIG. 9A is a model plan view depicting an example of a configuration of TFT elements arranged on a single scan signal line on a TFT substrate in which the design of Embodiment 1 has been implemented.
Figure 9B:
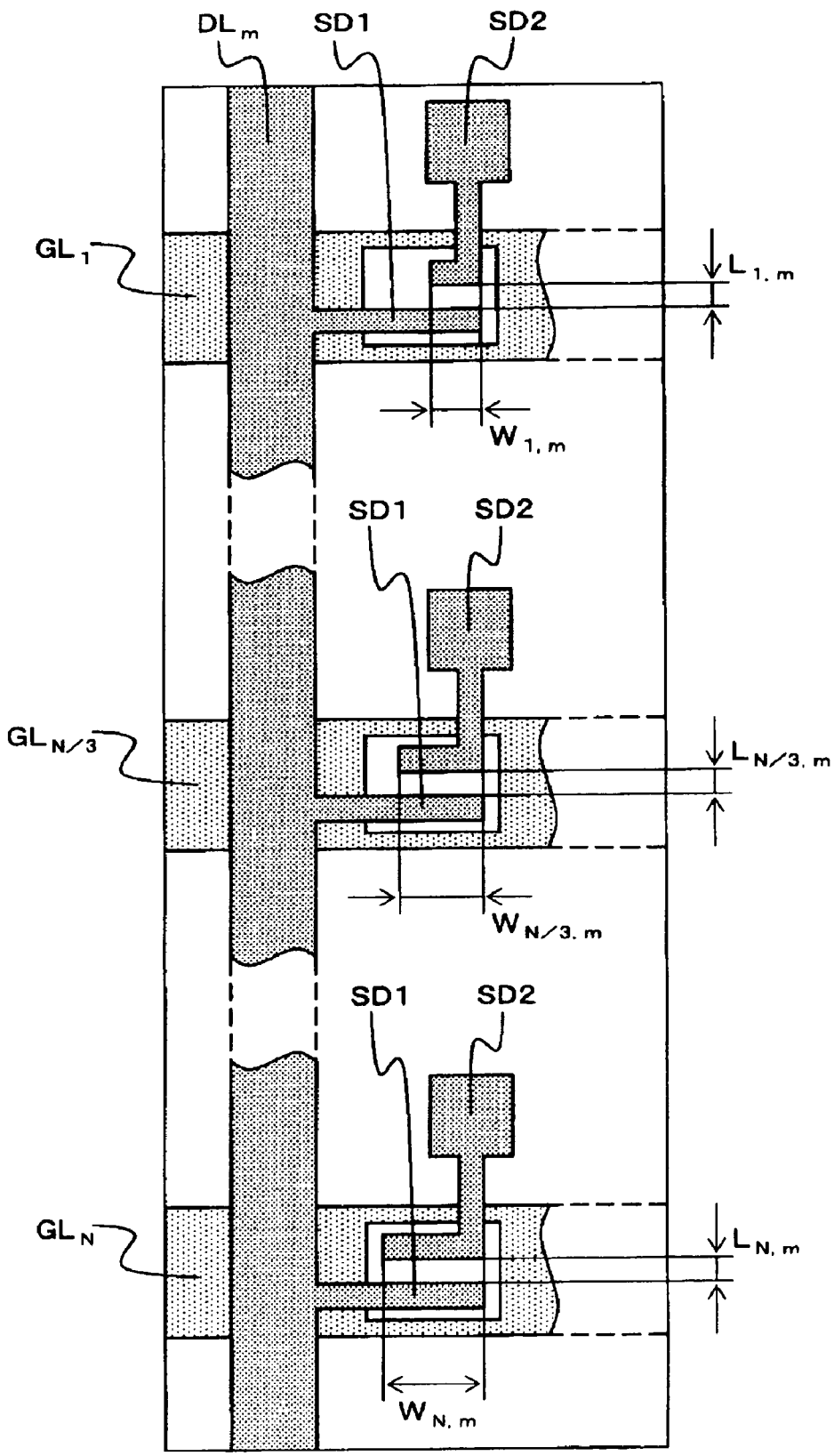
FIG. 9B is a model plan view depicting an example of a configuration of TFT elements arranged on a single picture signal line on a TFT substrate in which the design of Embodiment 1 has been implemented.

FIG. 7A is a model plan view depicting a simplified design of the liquid-crystal display panel according to Embodiment 1. FIG. 7B is a model sectional view taken along line A-A' in FIG. 7A. FIG. 8A is a model plan view depicting an example of a simplified design of an individual pixel on a TFT substrate of a liquid-crystal display panel. FIG. 8B is a model sectional view taken along line B-B' in FIG. 8A. FIG. 8C is a model sectional view taken along line C-C' in FIG. 8A. FIG. 9A is a model plan view depicting an example of a configuration of TFT elements arranged on a single scan signal line on the TFT substrate in which the design of Embodiment 1 has been implemented. FIG. 9B is a model plan view depicting an example of a configuration of TFT elements arranged on a single picture signal line on the TFT substrate in which the design of Embodiment 1 has been implemented.

As shown for example in FIGS. 7A and 7B, the liquid-crystal display panel 1 of Embodiment 1 is composed of liquid crystals LC sealed between a pair of substrates, namely, a TFT substrate 101 and a counter substrate 102. Here, the TFT substrate 101 and the counter substrate 102 are bonded with a ring-shaped sealing material 103 arranged on the outside of the display area DA, for example. The liquid crystals LC are hermetically sealed within the space defined by the TFT substrate 101, the counter substrate 102, and the sealing material 103.

As mentioned previously, the TFT substrate 101 is a substrate having a plurality of scan signal lines GL, a plurality of picture signal lines DL, TFT elements in a matrix arrangement, and pixel electrodes PX disposed on the surface of an insulating substrate such as a glass substrate. The counter substrate 102 is a substrate having, for example, light shields or color filters which are disposed on the surface of an insulating substrate such as a glass substrate and divide the display area DA into individual pixels.

When the liquid-crystal display panel 1 is of a vertical field driven design, e.g. a VA or TN type, the common electrode CT will be disposed on the counter substrate 102. Where the liquid-crystal display panel 1 is of a horizontal field driven design, e.g. an IPS type, the common electrode CT will be disposed on the TFT substrate 101.

Where the liquid-crystal display panel 1 is of a transmissive or semi-transmissive design, a pair of polarizing plates 104A, 104B for example will be provided on the outward-facing surfaces of the TFT substrate 101 and the counter substrate 102. In this case, one or several layers of retardation film may be disposed respectively between the TFT substrate 101 and the polarizing plate 104A, and between the other substrate 102 and the polarizing plate 104B.

Where the liquid-crystal display panel 1 is of a reflective design, the polarizing plate 104A and retardation film will generally not be needed on the TFT substrate 101 side.

In such a liquid-crystal display panel 1, the design of an individual pixel in the display area DA on the TFT substrate 101 will be as shown in FIGS. 8A through 8C for example. On the surface of the TFT substrate 101, a plurality of scan signal lines GL are formed on the surface of an insulating substrate SUB such as a glass substrate. The scan signal lines GL may be produced through etching of an electrically conductive film such as aluminum film, for example.

A semiconductor layer SC of TFT elements, the picture signal lines DL, and the drain electrodes SD1 and source electrodes SD2 of the TFT elements are formed over the insulating substrate SUB and the scan signal lines GL, via an intervening first insulating layer PAS1 which functions as the gate insulating film of the TFT elements. The first insulating layer PAS1 is produced through deposition of a silicon oxide ($SiO_2$) film for example. The semiconductor layer SC is produced, for example, by etching an amorphous silicon film, then doping using impurities to produce the channel regions, drain regions, and source regions. The picture signal lines DL, the drain electrodes SD1, and the source electrodes SD2 are produced through etching of a conductive film such as aluminum film. During this process the drain electrodes SD1 may be integrally formed with the picture signal lines DL, as portions of the picture signal lines DL for example.

The pixel electrodes PX are formed over the picture signal lines DL, and the like via an intervening second insulating layer PAS2. The pixel electrodes PX are produced through etching of a conductive film with a high light transmittance, such as an ITO film. The pixel electrodes PX are connected to the source electrodes SD2 via through-holes TH.

An alignment layer for example is formed over the pixel electrodes PX, although this is not depicted in FIGS. 8B and 8C.

When individual pixels of the TFT substrate 101 have a design such as that depicted in FIGS. 8A through 8C, individually setting the size (W/L) of each TFT element as indicated in the aforementioned Table 1 and Table 2 will cause the channel width W and channel length L of individual TFT elements in which the gate is connected to a single given scan signal line $GL_n$ to be as shown in FIG. 9A for example. FIG. 9A depicts only a TFT element $Tr_{n,1}$ in which the drain is connected to the picture signal line $DL_1$ situated closest to the signal input terminals of the scan signal lines $GL_n$, a TFT element $Tr_{n,M}$ in which the drain is connected to the picture signal lines $DL_M$ situated furthest away from the signal input terminals of the scan signal lines $GL_n$, and a TFT element $Tr_{n,M/3}$ in which the drain is connected to a picture signal line $DL_{n,M/3}$ therebetween.

For TFT elements in which the gate is connected to a single common scan signal line $GL_n$, where the channel width W and channel length L of the TFT elements have been established on the basis of the relationship in the graph of FIG. 5B for example, the level of change $\Delta(W/L)$ between the size $W_{n,1}/L_{n,1}$ of the TFT element $Tr_{n,1}$ in which the drain is connected to the picture signal line $DL_1$ and the size $W_{n,M/3}/L_{n,M/3}$ of the TFT element $Tr_{n,M/3}$ in which the drain is connected to the picture signal line $DL_{M/3}$ will be greater than the level of change $\Delta(W/L)$ between the size $W_{n,M/3}/L_{n,M/3}$ of the TFT element $Tr_{n,M/3}$ in which the drain is connected to the picture signal line $DL_{M/3}$ and the size $W_{n,M}/L_{n,m}$ of the TFT element $Tr_{n,M}$ in which the drain is connected to the picture signal line $DL_M$. Here, the size (W/L) of the TFT elements is increased, for example, by holding the channel length $L_{n,m}$ of the TFT elements constant, while progressively increasing the channel width $W_{n,m}$ dimension in elements further away from the signal input terminal of the scan signal line $GL_n$.

Similarly, the channel width W and channel length L of TFT elements in which the drain is connected to a single common picture signal line $DL_m$ will be as depicted in FIG. 9B for example. FIG. 9B depicts only a TFT element $Tr_1$ μm in which the gate is connected to the scan signal line $GL_1$ situated closest to the signal input terminals of the picture signal lines $DL_m$, a TFT element $Tr_{N,m}$ in which the gate is connected to the scan signal line $GL_N$ situated furthest away from the signal input terminals of the picture signal lines $DL_m$, and a TFT element $Tr_{N/3,m}$ in which the gate is connected to a scan signal line $GL_{N/3,m}$ therebetween.

For TFT elements in which the drain is connected to a single common picture signal line $DL_m$, where the channel width W and channel length L of the TFT elements have been established on the basis of the relationship in the graph of FIG. 6B for example, the level of change $\Delta(W/L)$ between the size $W_{1,m}/L_{1,m}$ of the TFT element $Tr_{1,m}$ in which the gate is connected to the scan signal line $GL_1$ and the size $W_{N/3,m}/L_{N/3,m}$ of the TFT element $Tr_{N/3,m}$ in which the gate is connected to the scan signal line $GL_{N/3}$ will be greater than the level of change $\Delta(W/L)$ between the size $W_{N/3,m}/L_{N/3,m}$ of the TFT element $Tr_{N/3,m}$ in which the gate is connected to the scan signal line $GL_{N/3}$ and the size $W_{N/m}/L_{N,m}$ of the TFT element $Tr_{N,m}$ in which the gate is connected to the scan signal line $GL_N$. Here as well, the size (W/L) of the TFT elements is increased, for example, by holding the channel length $L_{n,m}$ of the TFT elements constant while progressively increasing the channel width $W_{n,m}$ in elements further away from the signal input terminal of the picture signal line $DL_m$.

In the examples of FIGS. 9A and 9B, the size (W/L) of the TFT elements is varied by varying the TFT element channel width W while holding the channel length L constant; however, this method is not stipulated by way of limitation, and it shall be apparent that the size (W/L) of the TFT elements may be varied by varying only the channel length L, or both the channel width W and the channel length L.

According to the liquid-crystal display panel according to Embodiment 1 described above, individually setting the size (W/L) of each of the TFT elements arranged in a matrix in the display area DA makes it possible to reduce variation in the pre-write voltage $V_L$ of pixels caused by line delay on the scan signal lines GL and the picture signal lines DL.

Moreover, when setting the size (W/L) of the individual TFT elements, making the size of the TFT elements progressively smaller closer towards the signal input terminal relative to the size of the TFT element furthest away from the signal input terminal makes it possible to minimize parasitic capacitance of pixels having TFT elements closer to the signal input terminal, and to reduce variation in the feed-through voltage $V_{FT}$ of pixels.

Moreover, variation in the pre-write voltage $V_L$ and the feed-through voltage $V_{FT}$ among pixels making up the display area DA can be reduced in this way, and it will accordingly be possible, for example, to reduce the occurrence of irregular luminance and flicker and improve display quality in big-screen liquid-crystal display devices such as liquid-crystal display television sets.

The design described in Embodiment 1 is not limited to big-screen liquid-crystal display devices used in liquid-crystal display television sets and the like, and can be implemented as well in liquid-crystal display panels of high definition or fast drive speed. It shall be apparent that the design of Embodiment 1 could accordingly be implemented in a medium-size liquid-crystal display panel for use as a display in a notebook PC or mobile phone handset, for example.

Figure 10A:
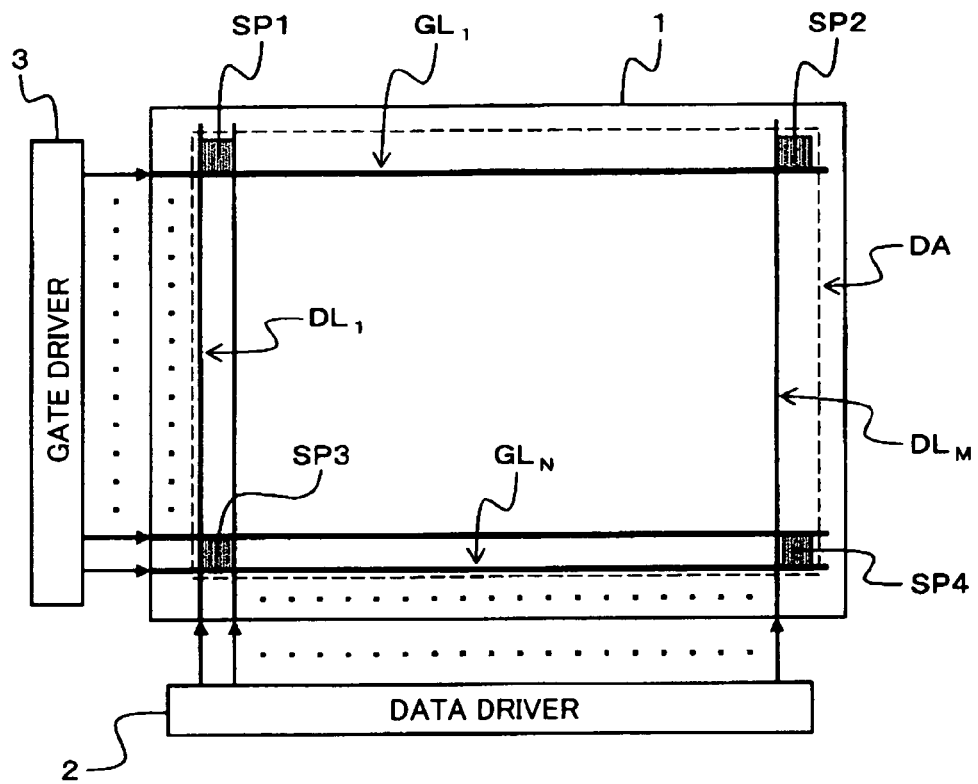
FIG. 10A is a model diagram depicting a simplified design for Modification Example 1 of the liquid-crystal display device according to the present invention.
Figure 10B:
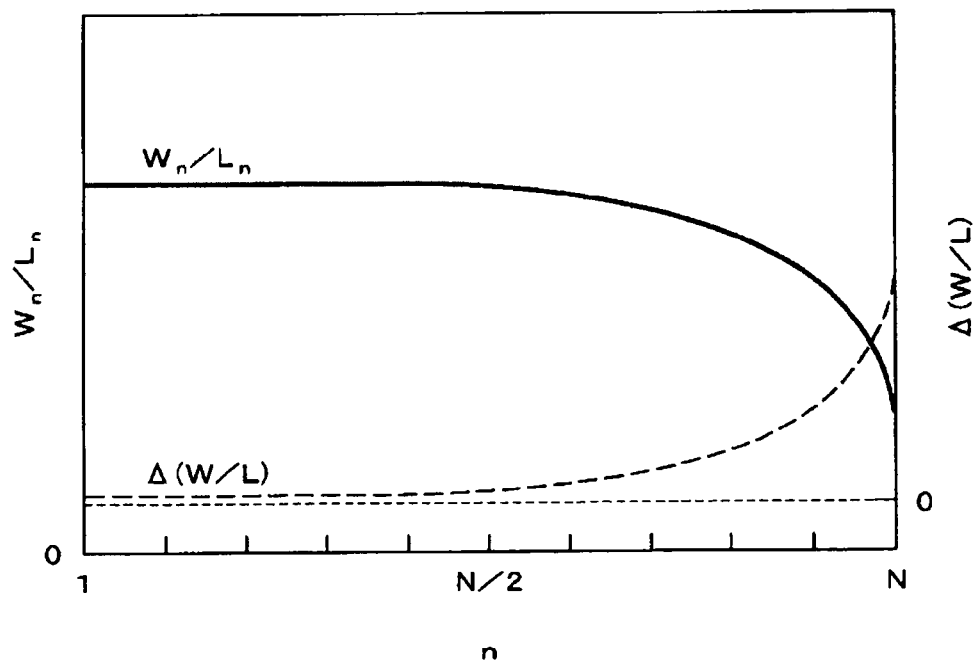
FIG. 10B is a model graph depicting an example of a method for setting the size (W/L) of TFT elements connected to a single common picture signal line, where the design of Embodiment 1 is implemented in the liquid-crystal display panel shown in FIG. 10A.

FIG. 10A is a model diagram depicting a simplified design for Modification Example 1 of the liquid-crystal display device according to the present invention. FIG. 10B is a model graph depicting an example of a method for setting the size (W/L) of TFT elements connected to a single common picture signal line, where the design of Embodiment 1 is implemented in the liquid-crystal display panel shown in FIG. 10A.

In Embodiment 1, a description was provided by way of example of a design in which the signal input terminals of the picture signal lines DL are situated at the upper side of the liquid-crystal display panel 1 (the display area DA), with the number N of scan signal lines GL being denoted by $GL_1, \ldots, GL_i, \ldots, GL_N$ in order starting from the upper scan signal line closest to the signal input terminals of the picture signal lines DL.

Figure 11A:
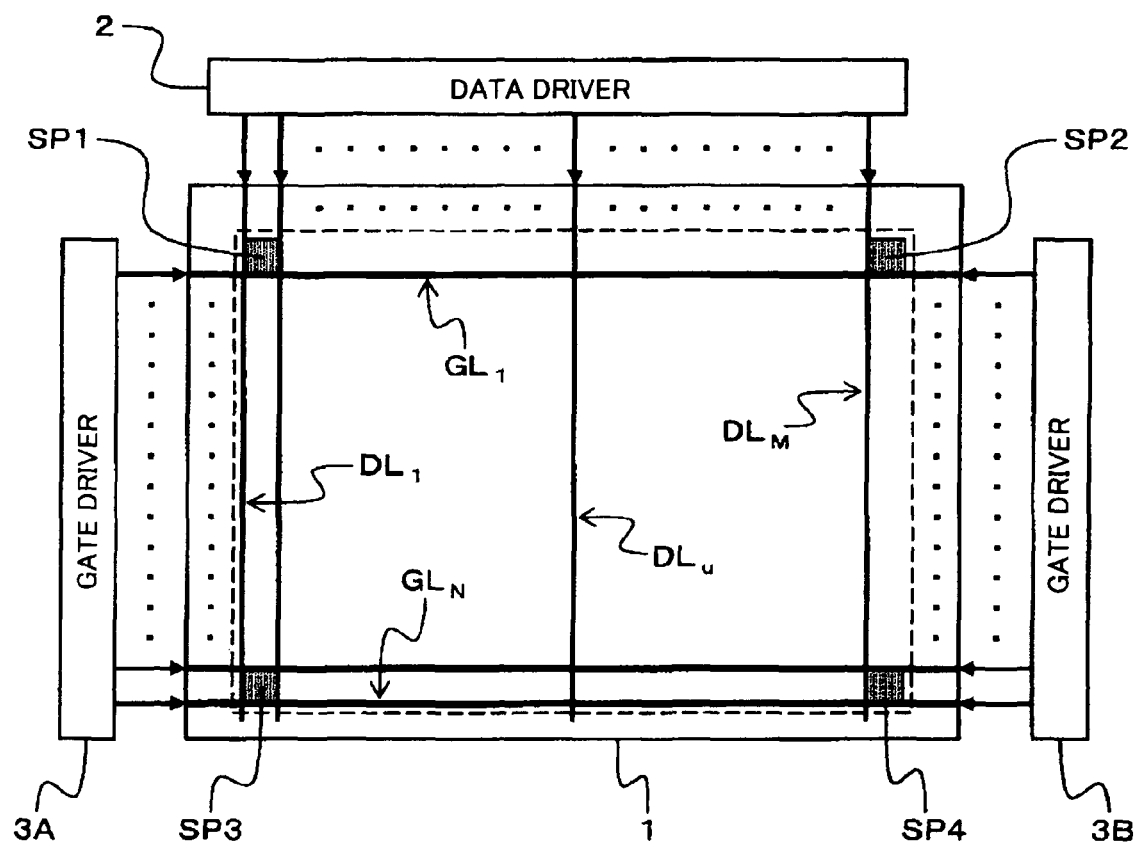
FIG. 11A is a model diagram depicting a simplified design of Modification Example 2 of the liquid-crystal display device according to the present invention.

However, in certain more-recent liquid-crystal display devices, the signal input terminals of the picture signal lines DL of the crystal display device are situated at the bottom side of the liquid-crystal display panel 1 (the display area DA), as shown in FIG. 11A for example. In such a case, where the number N of scan signal lines GL is denoted by $GL_1, \ldots, GL_i, \ldots, GL_N$ in order starting from the uppermost scan signal line of the display area DA, the scan signal line $GL_N$ will be the scan signal line GL which is closest to the signal input terminals of the picture signal lines DL.

It shall be apparent that in a case such as this where the lowermost scan signal line $GL_N$ of the display area DA is the scan signal line GL situated closest to the signal input terminals of the picture signal lines DL, the size (W/L) of the TFT elements in which the drain is connected to a single common picture signal line $DL_m$ may be as shown in the graph shown in FIG. 10B. In the graph of FIG. 10B, the horizontal axis gives the subscript "n" assigned to the scan signal lines $GL_n$ to which the gates of the TFT elements are connected; n assumes values of $1, 2, \ldots, N$ in order starting from the scan signal line closest to the signal input terminals of the picture signal lines $DL_m$. The vertical axis on the left side gives the size $(W_{n,m}/L_{n,m})$ of the TFT elements $Tr_{n,m}$; and the vertical axis on the right side gives $\Delta(W/L)=(W_{n,m}/L_{n,m})-((W_{n-,m}/L_{n-,m})$. On both the left vertical axis and the right vertical axis, the respective values increase going upward.

Figure 11B:
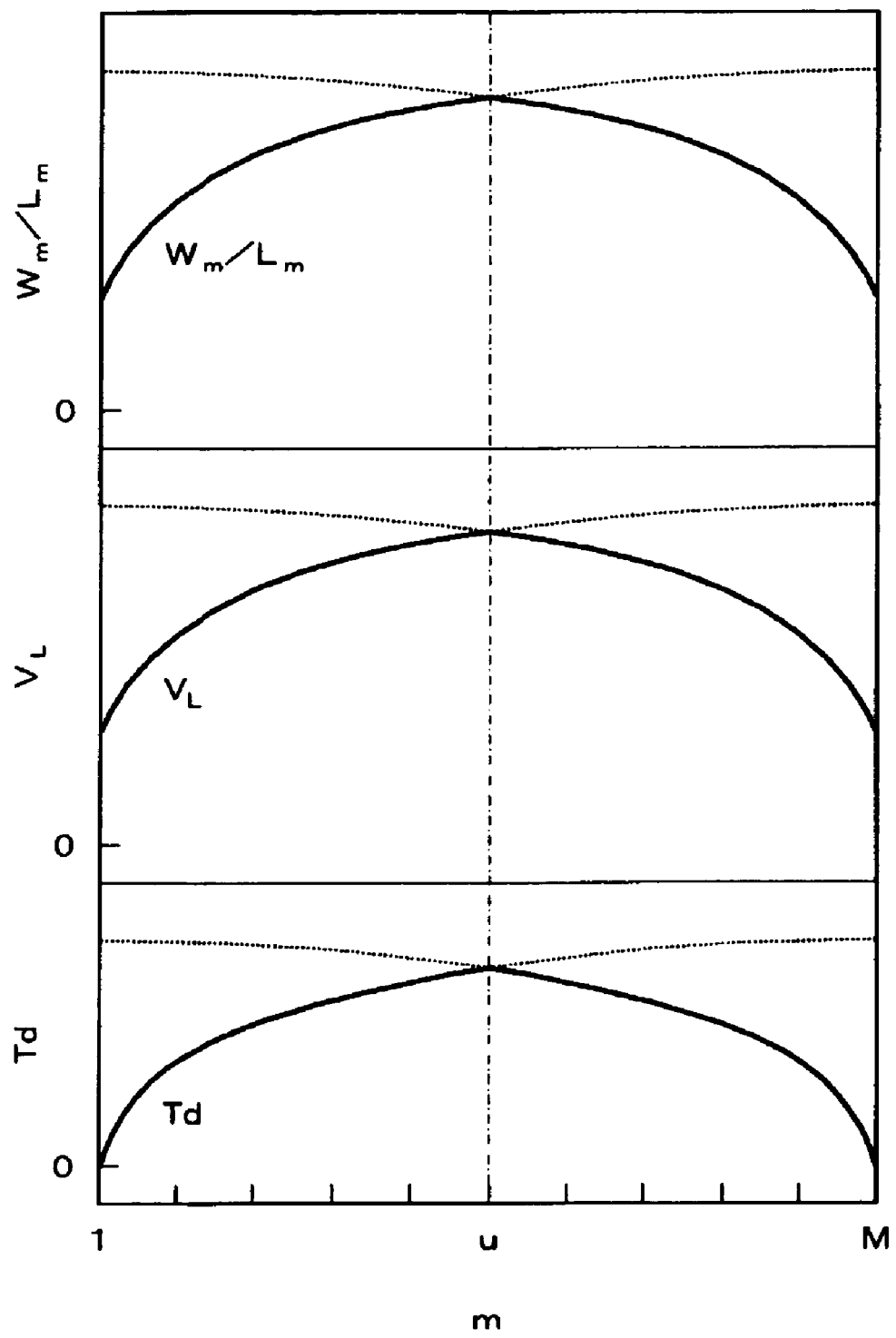
FIG. 11B is a model graph depicting, for the liquid-crystal display device shown in FIG. 11A in which the design of Embodiment 1 is implemented, an example of a relationship of location of a single scan signal line to the delay level of the scan signal; an example of a relationship of location of a single scan signal line to the pre-write voltage of pixels having TFT elements which are connected to a single common scan signal line; and an example of a method for setting the size (W/L) of TFT elements connected to a single common picture signal line.

FIG. 11A is a model diagram depicting a simplified design of Modification Example 2 of the liquid-crystal display device according to the present invention. FIG. 11B is a model graph depicting, for the liquid-crystal display device shown in FIG. 11A in which the design of Embodiment 1 is implemented, an example of a relationship between the location of a single scan signal line and the delay level of the scan signal; an example of a relationship between the location of a single scan signal line and the pre-write voltage of pixels having TFT elements which are connected to a single common scan signal line; and an example of a method for setting the size (W/L) of TFT elements connected to a single common picture signal line.

The description of Embodiment 1 up to this point has been based by way of example on a case where the signal input terminals of the scan signal lines GL are situated to the left side of the liquid-crystal display panel 1 (the display area DA), with the number M of picture signal lines DL designated by $DL_1, \ldots, DL_j, \ldots, DL_M$ in order from the picture signal line at left closest to the signal input terminals of the scan signal lines GL, as shown for example in FIG. 1A and FIG. 4.

However, in certain more recent liquid-crystal display devices, such as that shown in FIG. 11A, the signal input terminals of the scan signal lines GL may be situated at both the left side and the right side of the liquid-crystal display panel 1 (display area DA) of the liquid-crystal display device. In this case, where the M picture signal lines are designated as $DL_1, \ldots, DL_j, \ldots, DL_M$ in order from the leftmost picture signal line in the display area DA, the picture signal lines DL that are the shortest distance away from the signal input terminals of the scan signal lines GL will be the two picture signal lines $DL_1, DL_M$ which are situated furthest outward. The picture signal line DL that is the greatest distance away from the signal input terminals of the scan signal lines GL will be the picture signal line $DL_u$ which is situated approximately midway between the two outermost picture signal lines $DL_1$, $DL_M$.

Under these circumstances, the delay level Td of the scan signal $V_G$ input to a single scan signal line $GL_n$ will vary as shown in FIG. 11B for example, with the delay level being greatest at or near the location of the intersection with the picture signal line $DL_u$ that is situated approximately midway between the two outermost picture signal lines $DL_1$, $DL_M$. For this reason, the pre-write voltage $V_L$ in pixels having TFT elements in which the gate is connected to a single common scan signal line $GL_n$ will vary as shown in FIG. 11B. It shall accordingly be apparent that in the case of a liquid-crystal display panel 1 having signal input terminals at both ends of a single scan signal line $GL_n$, the size $(W_m/L_m)$ of the TFT elements in which the gate is connected to a single common scan signal line $GL_n$ may be set in the manner shown by the graph of FIG. 11B for example. In the graph of FIG. 11B, the horizontal axis gives the subscript "m" assigned to the picture signal lines $DL_m$ to which the drains of the TFT elements are connected; m assumes values of $1, 2, \ldots, M$ in order starting from the picture signal line closest to the signal input terminals on the left side of the scan signal lines $GL_n$. The vertical axis on the left side shows, in order from the bottom, the scan signal delay level Td, the pre-write voltage $V_L$, and the size $(W_{n,m}/L_{n,m})$ of the TFT elements $Tr_{n,m}$. On each of the left vertical axes, the respective values increase going upward.

Specifically, in the liquid-crystal display panel according to Embodiment 1, it is acceptable to establish the size (W/L)

of individual TFT elements according to the locations of the signal input terminals of the scan signal-lines GL and to the locations of the signal input terminals of the picture signal lines DL with respect to the display area DA of the TFT substrate 101. Accordingly, it shall be apparent that the design described in Embodiment 1 can be implemented even where positional relationships among the locations of the signal input terminals of the scan signal lines GL and the locations of the signal input terminals of the picture signal lines DL with respect to the display area DA of the TFT substrate 101 differ from those illustrated in FIG. 4 (FIG. 1A), FIG. 10A, and FIG. 11A.

Embodiment 2

Figure 12A:
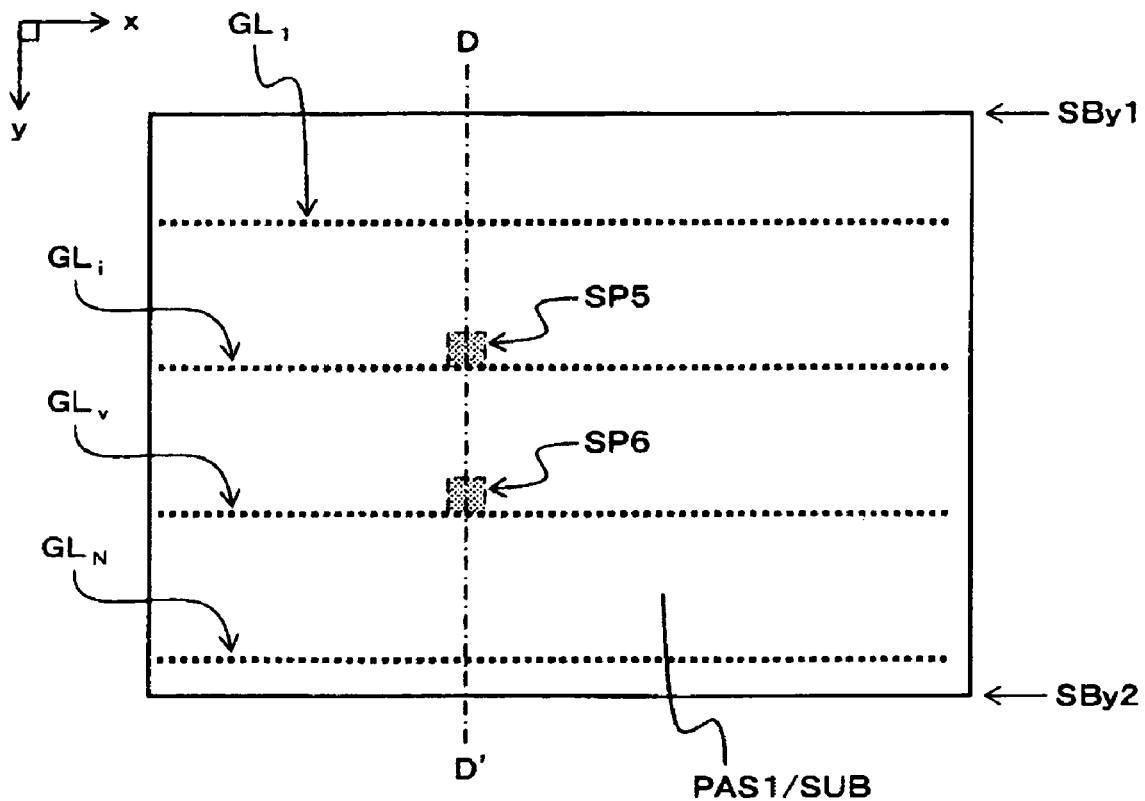
FIG. 12A is a model plan view depicting an example of a design of an insulating substrate immediately following formation of a first insulating layer.
Figure 12B:
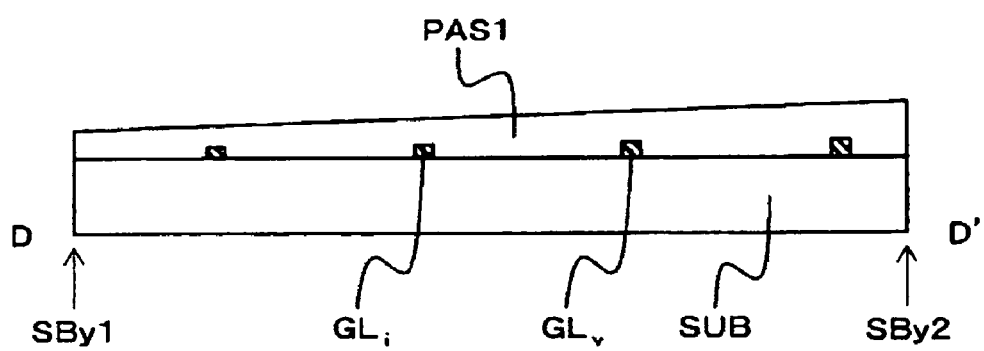
FIG. 12B is a model sectional view of an example of a cross section taken along line D-D' in FIG. 12A.
Figure 12D:
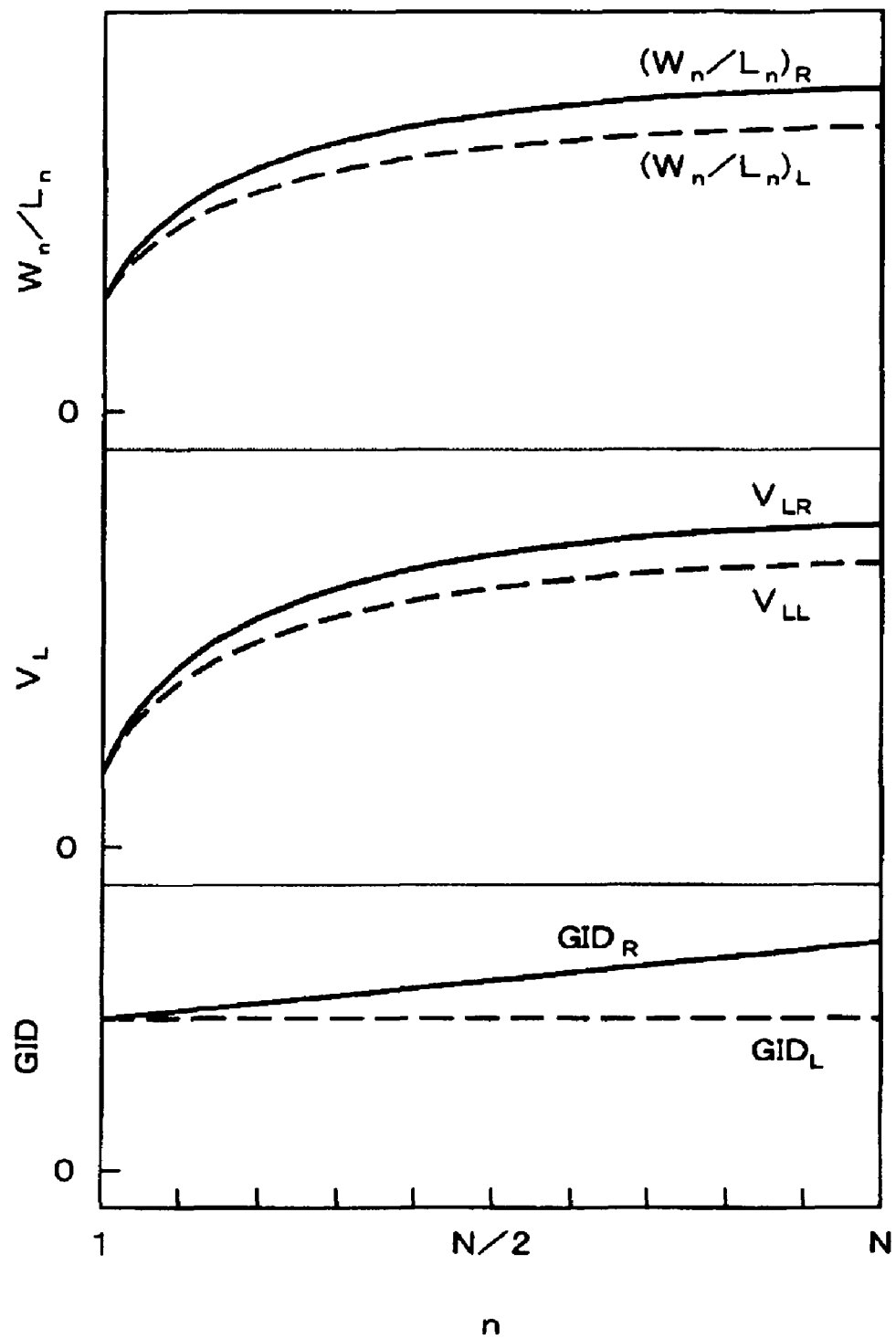
FIG. 12D is a model graph depicting, for the liquid-crystal display panel according to Embodiment 2, an example of a relationship of location of a single scan signal line to the thickness of the gate insulating film; an example of a relationship of location of a single scan signal line to the pre-write voltage of pixels having TFT elements which are connected to a single common scan signal line; and an example of a method for setting the size (W/L) of TFT elements connected to a single common scan signal line.

FIGS. 12A through 12D are model diagrams depicting an example of a simplified design of a TFT substrate according to Embodiment 2 of the present invention. FIG. 12A is a model plan view depicting an example of a design of an insulating substrate immediately following formation of a first insulating layer. FIG. 12B is a model sectional view of an example of a cross section taken along line D-D' in FIG. 12A. FIG. 12C is a model plan view depicting an example of planar configuration of TFT elements of two pixels SP5, SP6 shown in FIG. 12A. FIG. 12D is a model graph depicting, for the liquid-crystal display panel according to Embodiment 2, an example of a relationship between the location of a single scan signal line and the thickness of the gate insulating film; an example of a relationship between the location of a single scan signal line and the pre-write voltage of pixels having TFT elements which are connected to a single common scan signal line; and an example of a method for setting the size (W/L) of TFT elements connected to a single common scan signal line. FIG. 12C is a y-direction sectional view of the TFT elements of the two pixels SP5, SP6, and corresponds to the design of the portion of the TFT element shown in cross section in FIG. 8B.

In Embodiment 2, taking the example of the TFT substrate 101 having the design illustrated in FIGS. 8A through 8C, a description shall be provided of a design for the TFT substrate 101 whereby the design of the individual pixels can further improve display quality.

When the TFT substrate 101 having the design illustrated in FIGS. 8A through 8C is manufactured, the individual pixel design [is produced] by first forming a plurality of scan signal lines GL on the surface of an insulating substrate SUB such as a glass substrate. Next, a first insulating layer PAS1 which functions as the gate insulating film of the TFT elements is formed. A semiconductor layer SC is then formed. The picture signal lines DL (including the drain electrodes SD1) and the source electrodes SD2 are subsequently formed. A second insulating layer PAS2 is then formed. Finally, the pixel electrodes PX are formed.

In the process for manufacturing a conventional TFT substrate 101, the channel width W and the channel length L are typically established on the assumption that the gate insulating film (the first insulating layer PAS1) of the TFT elements has a uniform thickness. Specifically, when the TFT substrate 101 having the design described in Embodiment 1 is manufactured in accordance with a conventional manufacturing process, the channel width W and the channel length L of the TFT elements will typically be established on the assumption that the gate insulating film (the first insulating layer PAS1) of the TFT elements has a uniform thickness.

However, with regard to the insulating substrate SUB which has undergone processing up through formation of the first insulating layer PAS1, it may sometimes occur that, when the pixel SP5 and the pixel SP6 are viewed in cross section in the y direction as shown in FIG. 12A, the first insulating layer PAS1 will in fact have a monotonically increasing thickness between its two ends in the y direction, for example, from a first end SBy1 towards the other end SBy2 as shown in FIG. 12B.

When the thickness of the first insulating layer PAS1 varies, as depicted in FIG. 12B, the pixel SP5 and the pixel SP6 may have cross sectional shapes as illustrated in FIG. 12C for example. Specifically, the film thickness $GID_i$ of the gate insulating film (first insulating layer PAS1) in the TFT element of the pixel SP5 may be less than the film thickness $GID_v$ of the gate insulating film (first insulating layer PAS1) in the TFT element of the pixel SP6.

Here, as relates to the film thickness of the gate insulating film in TFT elements in which the drain is connected to a single common picture signal line DL, when the relationship between the film thickness $GID_L$ envisioned in the design stage and the film thickness $GID_R$ of the first insulating layer PAS1 that is actually formed is a relationship similar to that shown in the graph at the bottom in FIG. 12D for example, the relationship between the pre-write voltage $V_{LL}$ envisioned in the design stage for pixels having the TFT elements in question and their actual pre-write voltage $V_{LR}$ will be similar to that shown in the middle graph in FIG. 12D for example. Specifically, in pixels increasingly further away from the signal input terminal of the picture signal line DL, the actual pre-write voltage $V_{LR}$ will become progressively larger than the pre-write voltage $V_{LL}$ envisioned in the design stage.

Consequently, in such cases, the size $(W_n/L_n)_L$ of the TFT elements in the design stage will be corrected to TFT element sizes $(W_n/L_n)_R$ which reflect the film thickness $GID_R$ of the gate insulating film (first insulating layer PAS1) of the TFT elements, as shown in the graph at the top in FIG. 12D for example.

In the graph of FIG. 12D, the horizontal axis gives the subscript "n" assigned to the scan signal lines GL, to which the gates of the TFT elements are connected; n assumes values of 1, 2, . . . , N in order starting from the picture signal line closest to the signal input terminals of the scan signal lines $GL_n$. The vertical axis on the left side shows, in order from the bottom, the film thickness GID, the pre-write voltage $V_L$, and the size $(W_{n,m}/L_{n,m})$ of the TFT elements $Tr_{n,m}$. On each of the left vertical axes, the respective values increase going upward.

Correcting the size $(W_n/L_n)$ of the TFT elements with reference to the variation in film thickness of the actual first insulating layer PAS1 makes it possible to reduce differences between the write current values envisioned in the design stage and the write current values of the actual TFT elements resulting from the variation in film thickness of the gate insulating layer. It will accordingly be possible to further reduce variation in pre-write voltage $V_L$ among the pixels.

Moreover, it is exceedingly rare for variation in film thickness of the first insulating layer PAS1 to assume a random distribution for each TFT substrate 101, for example; typically, such variation can be classed into any of a number of patterns depending on the TFT substrate 101 manufacturing process. An example of a TFT substrate 101 manufacturing process and associated film thickness distribution pattern (tendency) of the first insulating layer PAS1 will be discussed below.

Figure 13A:
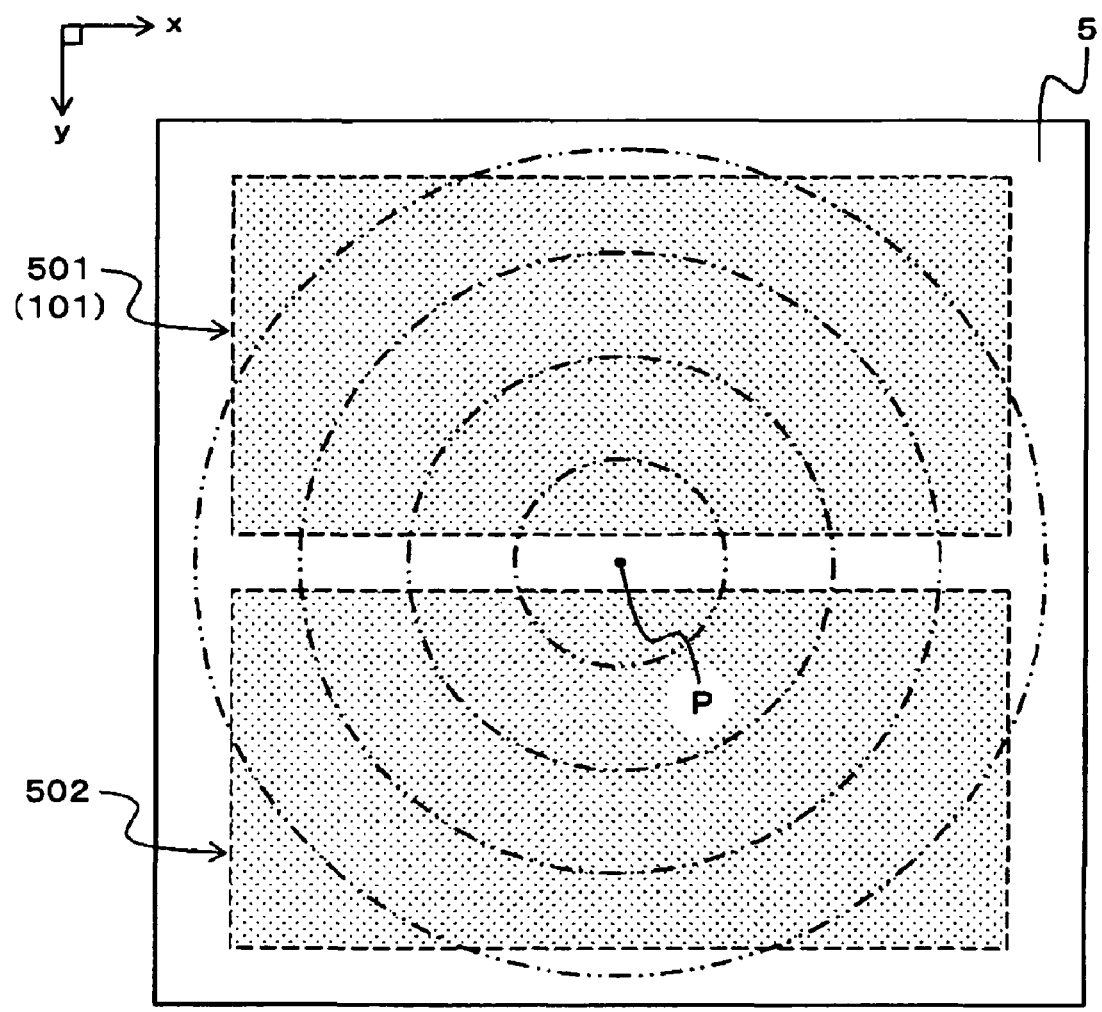
FIG. 13A is a model plan view depicting thickness distribution of an insulating film where two TFT substrates have been cut from a single sheet of mother glass.
Figure 13B:
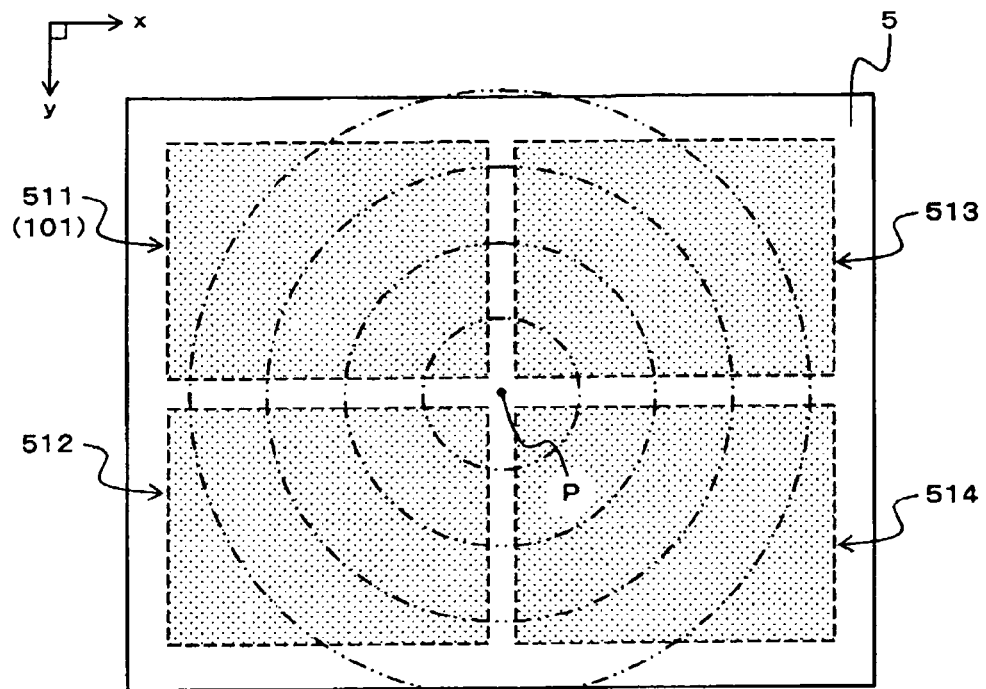
FIG. 13B is a model plan view depicting thickness distribution of an insulating film where four TFT substrates have been cut from a single sheet of mother glass.
Figure 13C:
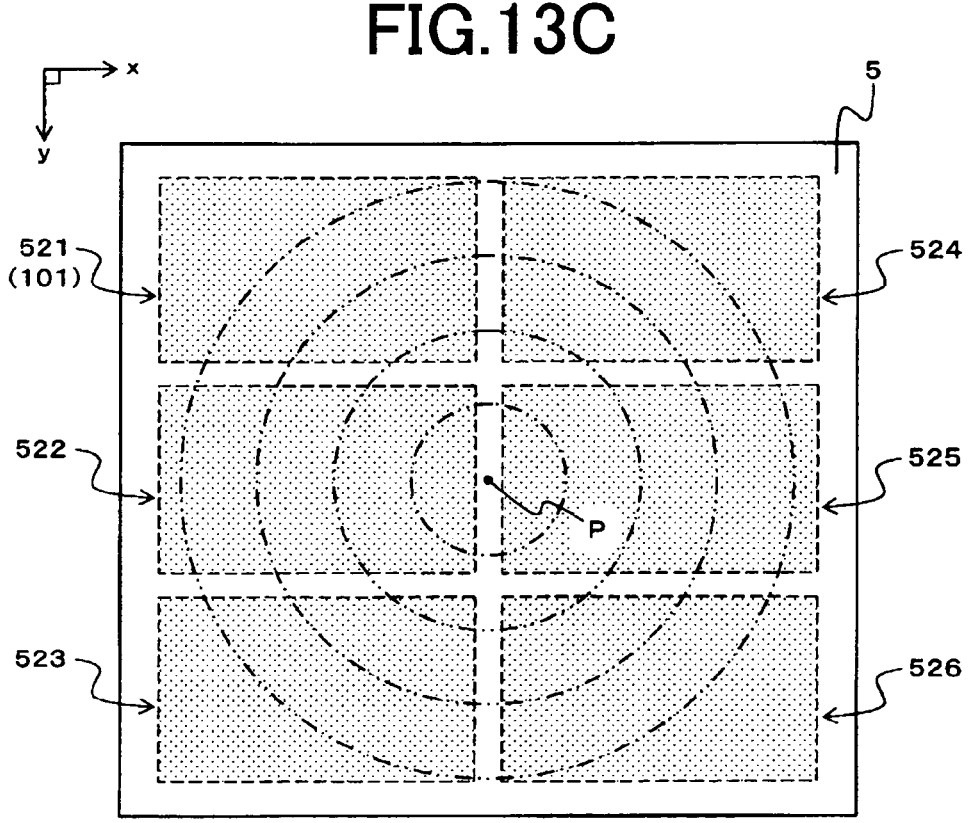
FIG. 13C is a model plan view depicting thickness distribution of an insulating film where six TFT substrates have been cut from a single sheet of mother glass.
Figure 13D:
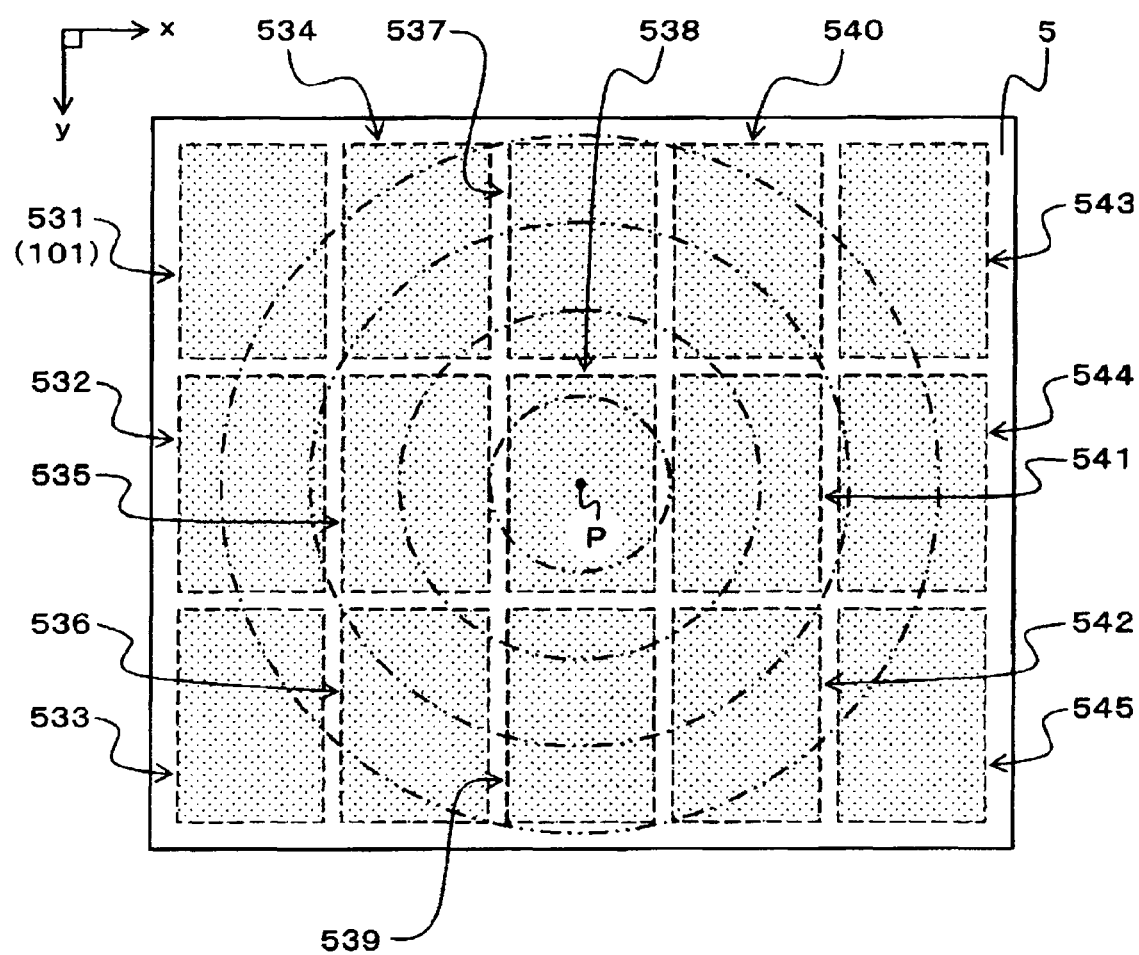
FIG. 13D is a model plan view depicting thickness distribution of an insulating film where 15 TFT substrates have been cut from a single sheet of mother glass.

FIG. 13A is a model plan view depicting the thickness distribution of an insulating film where two TFT substrates have been cut from a single sheet of mother glass. FIG. 13B is a model plan view depicting the thickness distribution of an insulating film where four TFT substrates have been cut from a single sheet of mother glass. FIG. 13C is a model plan view depicting the thickness distribution of an insulating film where six TFT substrates have been cut from a single sheet of mother glass. FIG. 13D is a model plan view depicting the thickness distribution of an insulating film where 15 TFT substrates have been cut from a single sheet of mother glass.

Currently, TFT substrates 101 for use in liquid-crystal display panels 1 are manufactured for example by a process known as "multiple panel fabrication" which involves forming patterns for multiple TFT panels on a single large glass substrate (mother glass), then cutting the individual TFT substrates 101 from the mother glass.

In the case of "2-panel fabrication" in which two TFT substrates 101 are cut from a single piece of mother glass, a TFT substrate 101 will be formed in each of two regions 501, 502 of a single piece of mother glass 5, as shown in FIG. 13A for example. After the TFT substrate 101 is formed in each of the regions 501, 502, two separate TFT substrates 101 are obtained by cutting out the regions 501, 502 from the mother glass 5.

In the case of such 2-panel fabrication, the insulating film for forming the first insulating layer PAS1 in the respective regions 501, 502 of the mother glass 5 will typically be formed (deposited) over the entire face of the mother glass 5. Here, where the thickness distribution of the insulating film formed over the entire face of the mother glass 5 is represented by concentric circles centered on the center P of the mother glass 5 as shown by the double-dot and dashed lines in FIG. 13A for example, the distribution is thickest at the center P and surrounding area, becoming gradually thinner further away from the center P. This is due to the fact that the insulating film, when formed, is deposited by a plasma CVD process.

In the case of "4-panel fabrication" in which four TFT substrates 101 are cut from a single piece of mother glass, a TFT substrate 101 will be formed in each of regions 511, 512, 513, 514 of a single piece of mother glass 5, as shown in FIG. 13B for example. After the TFT substrate 101 is formed in each of the regions 511 through 514, four separate TFT substrates 101 are obtained by cutting out the regions 511 through 514 from the mother glass 5.

In the case of such 4-panel fabrication as well, the insulating film for forming the first insulating layer PAS1 in the respective regions 511 through 514 of the mother glass 5 will typically be formed over the entire face of the mother glass 5. Here as well, where the thickness distribution of the insulating film formed over the entire face of the mother glass 5 is represented by concentric circles centered on the center P of the mother glass 5 as shown by the double-dot and dashed lines in FIG. 13B for example, the distribution is thickest at the center P and surrounding area, becoming gradually thinner further away from the center P.

In the case of "6-panel fabrication" in which six TFT substrates 101 are cut from a single piece of mother glass, a TFT substrate 101 will be formed in each of regions 521, 522, 523, 524, 525, 526 of a single piece of mother glass 5, as shown in FIG. 13C for example. After the TFT substrates 101 are formed in each of the regions 521 through 526, six separate TFT substrates 101 are obtained by cutting out the regions 521 through 526 from the mother glass 5.

In the case of such 6-panel fabrication as well, the insulating film for forming the first insulating layer PAS1 in the respective regions 521 through 526 of the mother glass 5 will typically be formed over the entire face of the mother glass 5. Here as well, where the thickness distribution of the insulating film formed over the entire face of the mother glass 5 is represented by concentric circles centered on the center P of the mother glass as shown by the double-dot and dashed lines in FIG. 13C for example, the distribution is thickest at the center P and surrounding area, becoming gradually thinner further away from the center P.

In the case of "15-panel fabrication" in which 15 TFT substrates 101 are cut from a single piece of mother glass, a TFT substrate 101 will be formed in each of regions 531, 532, 533, 534, 535, 536, 537, 538, 539, 540, 541, 542, 543, 544, 545 of a single piece of mother glass 5, as shown in FIG. 13D for example. After the TFT substrates 101 are formed in each of the regions 531 through 545, 15 separate TFT substrates 101 are obtained by cutting out the regions 531 through 545 from the mother glass 5.

In the case of such 15-panel fabrication as well, the insulating film for forming the first insulating layer PAS1 in the respective regions 531 through 545 of the mother glass 5 will typically be formed over the entire face of the mother glass 5. Here as well, where the thickness distribution of the insulating film formed over the entire face of the mother glass 5 is represented by concentric circles centered on the center P of the mother glass 5 as shown by the double-dot and dashed lines in FIG. 13D for example, the distribution is thickest at the center P and surrounding area, becoming gradually thinner further away from the center P.

The description shall now focus on the relationship between the thickness distribution of the insulating film formed on the single pieces of mother glass 5 illustrated in FIGS. 13A through 13D, and the thickness distribution of the individual regions cut from the mother glass 5; i.e. the insulating film in each of the regions where a single TFT substrate 101 was formed. It shall be apparent that these relationships may be classed into the following four patterns.

Figure 14:
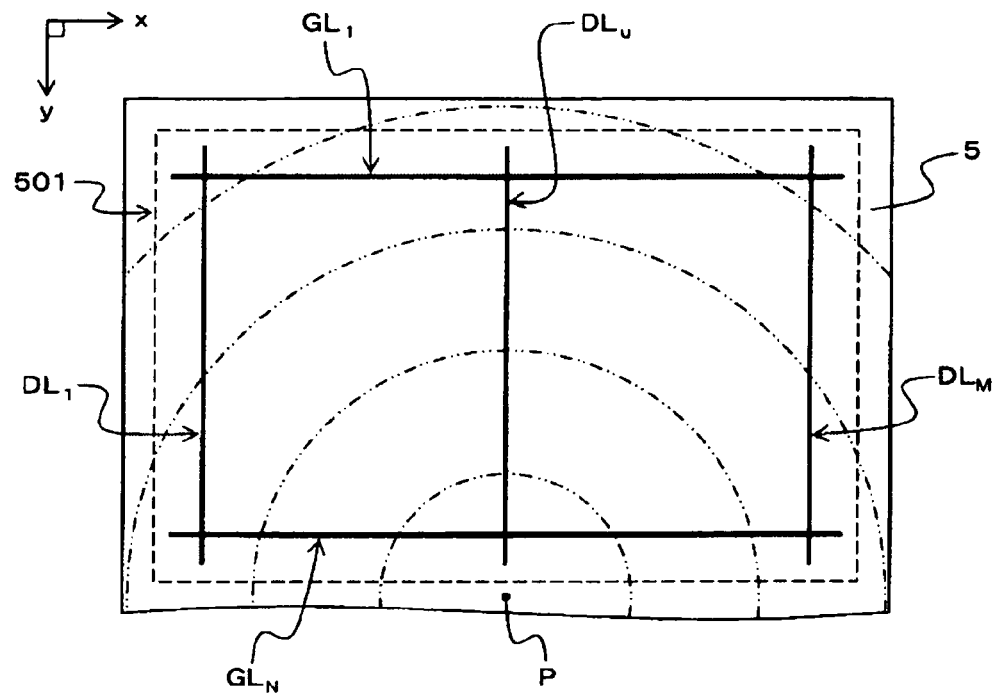
FIG. 14 is a model plan view depicting an example of a relationship of a first pattern of insulating layer thickness distribution to thickness of the gate insulating film in individual TFT elements.

The first pattern is a one in which film thickness of the insulating film in the x direction and film thickness in the y direction respectively vary as in the regions 501, 502 appearing in FIG. 13A and the regions 537, 539 appearing in FIG. 13D. Reference is made to FIG. 14 in the following discussion of the relationship of this first pattern to the gate insulating films of the TFT elements (active elements) which are formed in the display area of a single TFT substrate 101.

FIG. 14 is a model plan view depicting an example of a relationship of the first pattern of insulating layer thickness distribution and the thickness of the gate insulating film in individual TFT elements.

The following discussion of the relationship between the first pattern of insulating layer thickness distribution and the thickness of the gate insulating films in individual TFT elements will focus by way of example on the TFT substrate which is formed in the region 501 of the mother glass 5 in the case of 2-panel fabrication as depicted in FIG. 14. In FIG. 14, $GL_1$, $GL_N$ denote the scan signal lines situated furthest outward in the display area; and $DL_1$, $DL_M$ denote the picture signal lines situated furthest outward in the display area. Between the two scan signal lines $GL_1$, $GL_N$ are situated a number of additional scan signal lines (not shown). Between the two picture signal lines $DL_1$, $DL_M$ are situated a picture signal line $DL_L$ located at the midpoint between them, as well as a number of additional picture signal lines which are not shown.

Here, the film thickness of the first insulating layer PAS1 on the scan signal line $GL_N$ will, for example, reach a maximum at or near the point at which the scan signal line $GL_N$ intersects the picture signal line DL, and progressively decrease further away from this point of intersection. For this reason, the film thickness of the gate insulating films of the TFT elements in which the gate is connected to the scan signal line $GL_N$ will, for example, reach a maximum in the gate insulating film of the TFT element in which the drain is connected to the picture signal line $DL_u$, and reach a minimum in the gate insulating film of the TFT element in which the drain is connected to the picture signal line $DL_1$ or in the TFT element in which the drain is connected to the picture signal line $DL_M$, or in both.

Meanwhile, the film thickness of the first insulating layer PAS1 under the picture signal line $DL_u$ will, for example, increase monotonically from the point where the scan signal line $GL_1$ and the picture signal line $DL_u$ intersect to the point where the scan signal line $GL_N$ and the picture signal line $DL_u$ intersect. For this reason, the film thickness of the gate insulating films of the TFT elements in which the drain is connected to the picture signal line $DL_u$ will reach a minimum in the gate insulating film of the TFT element in which the gate is connected to the scan signal line $GL_1$, and reach a maximum in the gate insulating film of the TFT element in which the gate is connected to the scan signal line $GL_N$, for example.

Consequently, the film thickness of the gate insulating films of the TFT elements on the TFT substrate 101 which is formed in the region 501 of the mother glass 5 will, for example, reach a maximum in the gate insulating film of the TFT element in which the gate is connected to the scan signal line $GL_N$ and in which the drain is connected to the picture signal line $DL_u$, and progressively decrease in insulating films of TFT elements further away from the TFT element in question. Individually setting the size (W/L) of the TFT elements based on such variation in thickness of the gate insulating films of the TFT elements, and on the locations of the signal input terminals of the scan signal line GL and the signal input terminals of the picture signal line DL with respect to the TFT substrate 101 formed in the region 501 thus makes it possible to reduce variation among pixels in the magnitude of the pre-write voltage $V_L$ and in the magnitude of the feed-through voltage $V_{FT}$.

The above discussion made with reference to FIG. 14 pertains to the example of the TFT substrate formed in the region 501 of the mother glass 5 in the case of 2-panel fabrication; however, as also pertains to a TFT substrate formed in the one other region 502, it will be possible to reduce variation among pixels in the magnitude of the pre-write voltage $V_L$ and in the magnitude of the feed-through voltage $V_{FT}$ by individually setting the size (W/L) of the TFT elements with an approach similar to that for the TFT substrate of the region 501. Moreover, for the TFT substrates formed in the regions 537, 539 in the case of the 15-panel fabrication shown in FIG. 13D as well, it will be possible to reduce variation among pixels in the magnitude of the pre-write voltage $V_L$ and in the magnitude of the feed-through voltage $V_{FT}$ by individually setting the size (W/L) of the TFT elements with an approach similar to that for the TFT substrate of the region 501.

Next, the second pattern will be discussed. The second pattern is a pattern in which the film thickness of the insulating film in the x direction and film thickness in the y direction respectively vary as in the regions 522, 525 appearing in FIG. 13C and the regions 532, 535, 541, 544 appearing in FIG. 13D. The following discussion of the relationship of this second pattern to the gate insulating films of the TFT elements (active elements) which are formed in the display area of a single TFT substrate 101 makes reference to FIG. 15.

Figure 15:
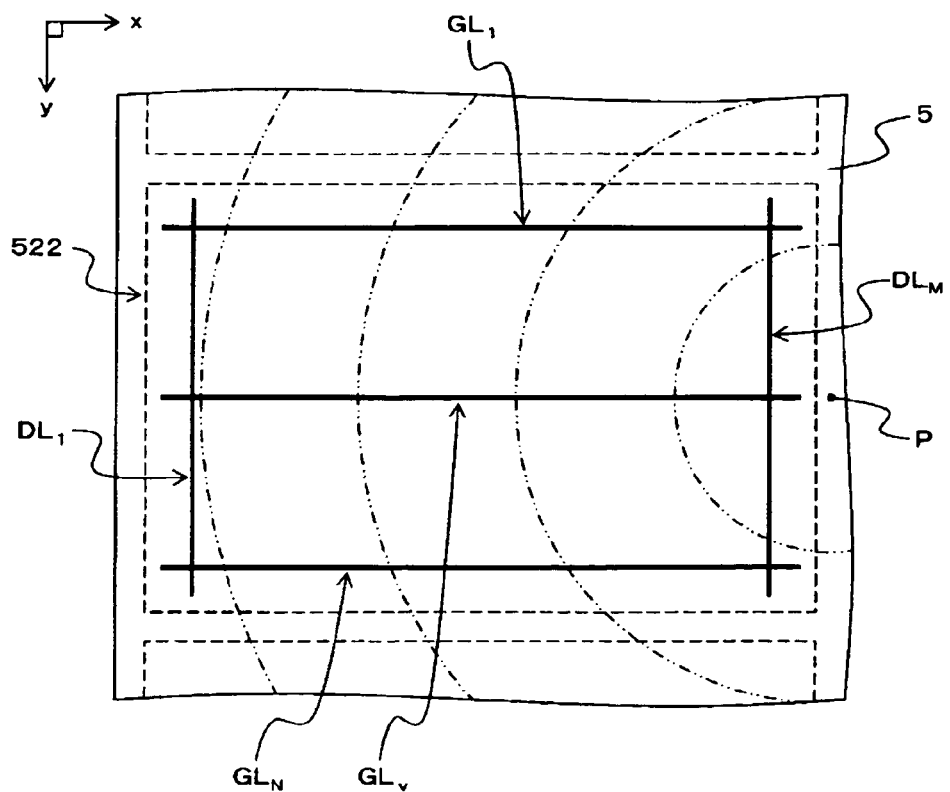
FIG. 15 is a model plan view depicting an example of a relationship of a second pattern of insulating layer thickness distribution to thickness of the gate insulating film in individual TFT elements.

FIG. 15 is a model plan view depicting an example of a relationship between the second pattern of insulating layer thickness distribution and the thickness of the gate insulating film in individual TFT elements.

The following discussion of the relationship between the second pattern of insulating layer thickness distribution and the thickness of the gate insulating films in individual TFT elements will focus by way of example on the TFT substrate which is formed in the region 522 of the mother glass 5 in the case of 6-panel fabrication as depicted in FIG. 15. In FIG. 15, $GL_1$, $GL_N$ denote the scan signal lines situated furthest outward in the display area; and $DL_1$, $DL_M$ denote the picture signal lines situated furthest outward in the display area. Between the two scan signal lines $GL_1$, $GL_N$ are situated a scan signal line $GL_v$ located substantially at midpoint between them, and a number of additional scan signal lines which are not shown. Between the two picture signal lines $DL_1$, $DL_M$ are situated a number of additional picture signal lines which are not shown.

Here, the film thickness of the first insulating layer PAS1 on the scan signal line $GL_v$ will, for example, increase monotonically starting from the point where the scan signal line $GL_v$ and the picture signal line $DL_1$ intersect, towards the point where the scan signal line $GL_v$ and the picture signal line $DL_M$ intersect. For this reason, the film thickness of the gate insulating films of the TFT elements in which the gate is connected to the scan signal line $GL_v$ will, for example, reach a minimum in the gate insulating film of the TFT element in which the drain is connected to the picture signal line $DL_1$ and reach a maximum in the gate insulating film of the TFT element in which the drain is connected to the picture signal line $DL_M$.

Meanwhile, the film thickness of the first insulating layer PAS1 under the picture signal line $DL_M$ will reach a maximum, for example, at or near the point at which the scan signal line $GL_v$ intersects the picture signal line $DL_M$, and progressively decrease further away from this point of intersection. For this reason, the film thickness of the gate insulating films of the TFT elements in which the drain is connected to the picture signal line $DL_M$ will, for example, reach a maximum in the gate insulating film of the TFT element in which the gate is connected to the scan signal line $GL_v$ and reach a minimum in the gate insulating film of the TFT element in which the gate is connected to the scan signal line $GL_1$ or in the TFT element in which the gate is connected to the scan signal line $GL_N$, or in both.

Consequently, the film thickness of the gate insulating films of the TFT elements on the TFT substrate 101 which is formed in the region 522 of the mother glass 5 will, for example, reach a maximum in the gate insulating film of the TFT element in which the gate is connected to the scan signal line $GL_v$ and in which the drain is connected to the picture signal line $DL_M$, and progressively decrease in insulating films of TFT elements further away from the TFT element in question. Thus, individually setting the size (W/L) of the TFT elements based on such variation in thickness of the gate insulating films of the TFT elements, and on the locations of the signal input terminals of the scan signal line GL and the signal input terminals of the picture signal line DL with respect to the TFT substrate 101 formed in the region 522 will make it possible to reduce variation among pixels in the magnitude of the pre-write voltage $V_L$ and in the magnitude of the feed-through voltage $V_{FT}$.

The above discussion made with reference to FIG. 15 pertains to the example of a TFT substrate formed in the region 522 in the case of 6-panel fabrication; however, as also pertains to a TFT substrate formed in one other region 525, it will be possible to reduce variation among pixels in the magnitude of the pre-write voltage $V_L$ and in the magnitude of the feed-through voltage $V_{FT}$ by individually setting the size (W/L) of the TFT elements with an approach similar to that for the TFT substrate of the region 522. Moreover, for the TFT substrates formed in the regions 532, 535, 541, 544 in the case of the 15-panel fabrication shown in FIG. 13D as well, it will be possible to reduce variation among pixels in the magnitude of the pre-write voltage $V_L$ and in the magnitude of the feed-through voltage $V_{FT}$ by individually setting the size (W/L) of the TFT elements with an approach similar to that for the TFT substrate of the region 522.

Figure 16:
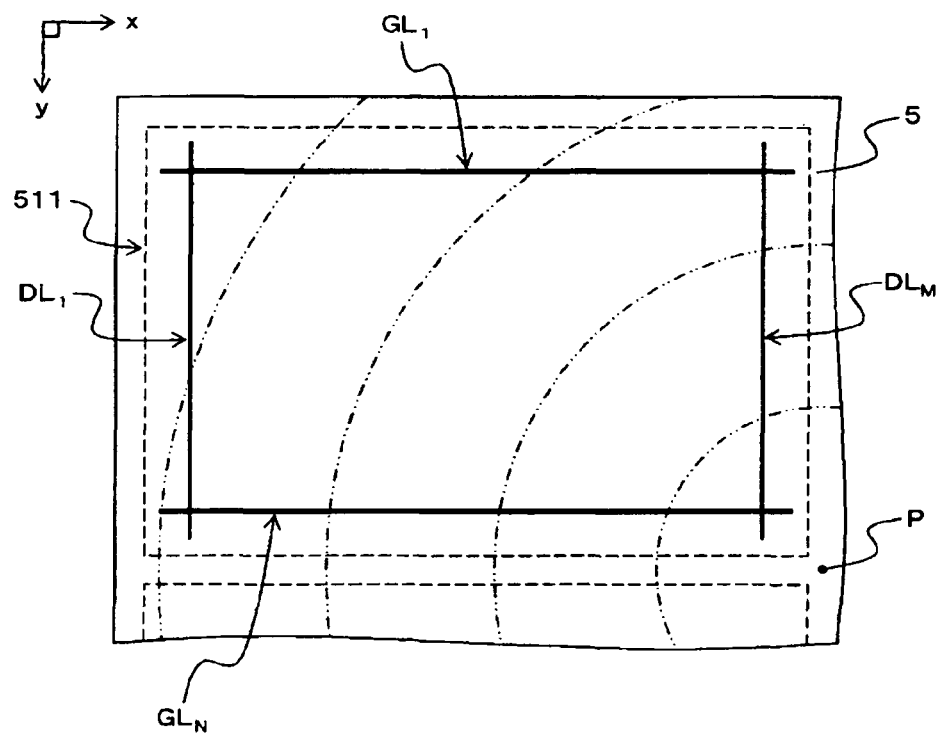
FIG. 16 is a model plan view depicting an example of a relationship of a third pattern of insulating layer thickness distribution to thickness of the gate insulating film in individual TFT elements.

Next, the third pattern will be discussed. The third pattern is one in which the film thickness of the insulating film in the x direction and film thickness in the y direction respectively vary as in the regions 511, 512, 513, 514 appearing in FIG. 13B, the regions 521, 523, 524, 526 appearing in FIG. 13C, and the regions 531, 533, 534, 536, 540, 542, 543, 545 appearing in FIG. 13D. Reference is made to FIG. 16 in the following discussion of the relationship between this third pattern and the gate insulating films of the TFT elements (active elements) which are formed in the display area of a single TFT substrate 101.

FIG. 16 is a model plan view depicting an example of a relationship between the third pattern of insulating layer thickness distribution and the thickness of the gate insulating film in individual TFT elements.

The following discussion of the relationship between the third pattern of insulating layer thickness distribution and the thickness of the gate insulating films in individual TFT elements will focus by way of example on the TFT substrate which is formed in the region 511 of the mother glass 5 in the case of 4-panel fabrication as depicted in FIG. 16. In FIG. 16, $GL_1$, $GL_N$ denote the scan signal lines situated furthest outward in the display area; and $DL_1$, $DL_M$ denote the picture signal lines situated furthest outward in the display area. Between the two scan signal lines $GL_1$, $GL_N$ are situated a number of additional scan signal lines (not shown); and between the two picture signal lines $DL_1$, $DL_M$ are situated a number of additional picture signal lines (not shown).

Here, the film thickness of the first insulating layer PAS1 on the scan signal line $GL_N$ will, for example, increase monotonically starting from the point where the scan signal line $GL_N$ and the picture signal line $DL_1$ intersect, towards the point where the scan signal line $GL_N$ and the picture signal line $DL_M$ intersect. For this reason, the film thickness of the gate insulating films of the TFT elements in which the gate is connected to the scan signal line $GL_N$ will, for example, reach a minimum in the gate insulating film of the TFT element in which the drain is connected to the picture signal line $DL_1$ and reach a maximum in the gate insulating film of the TFT element in which the drain is connected to the picture signal line $DL_M$.

Meanwhile, the film thickness of the first insulating layer PAS1 under the picture signal line $DL_M$ will, for example, increase monotonically starting from the point where the scan signal line $GL_1$ and the picture signal line $DL_M$ intersect, towards the point where the scan signal line $GL_N$ and the picture signal line $DL_M$ intersect. For this reason, the film thickness of the gate insulating films of the TFT elements in which the drain is connected to the picture signal line $DL_M$ will, for example, reach a minimum in the gate insulating film of the TFT element in which the gate is connected to the scan signal line $GL_1$ and reach a maximum in the gate insulating film of the TFT element in which the gate is connected to the scan signal line $GL_N$.

Consequently, the film thickness of the gate insulating films of the TFT elements on the TFT substrate 101 which is formed in the region 511 of the mother glass 5 will, for example, reach a maximum in the gate insulating film of the TFT element in which the gate is connected to the scan signal line $GL_N$ and in which the drain is connected to the picture signal line $DL_M$, and progressively decrease in insulating films of TFT elements further away from the TFT element in question. Individually setting the size (W/L) of the TFT elements based on such variation in thickness of the gate insulating films of the TFT elements, and on the locations of the signal input terminals of the scan signal line GL and the signal input terminals of the picture signal line DL with respect to the TFT substrate 101 formed in the region 511 accordingly makes it possible to reduce variation among pixels in the magnitude of the pre-write voltage $V_L$ and in the magnitude of the feed-through voltage $V_{FT}$.

The above discussion made with reference to FIG. 16 pertains to the example of a TFT substrate formed in the region 511 in the case of 4-panel fabrication; however, as also pertains to TFT substrates formed in the three other regions 512 through 514, it will be possible to reduce variation among pixels in the magnitude of the pre-write voltage $V_L$ and in the magnitude of the feed-through voltage $V_{FT}$ by individually setting the size (W/L) of the TFT elements with an approach similar to that for the TFT substrate of the region 511. Moreover, for TFT substrates formed in the regions 521, 523, 524, 526 in the case of the 6-panel fabrication shown in FIG. 13C, and for TFT substrates formed in the regions 532, 535, 541, 544 in the case of the 15-panel fabrication shown in FIG. 13D as well, it will be possible to reduce variation among pixels in the magnitude of the pre-write voltage $V_L$ and in the magnitude of the feed-through voltage $V_{FT}$ by individually setting the size (W/L) of the TFT elements with an approach similar to that for the TFT substrate of the region 511.

Figure 17:
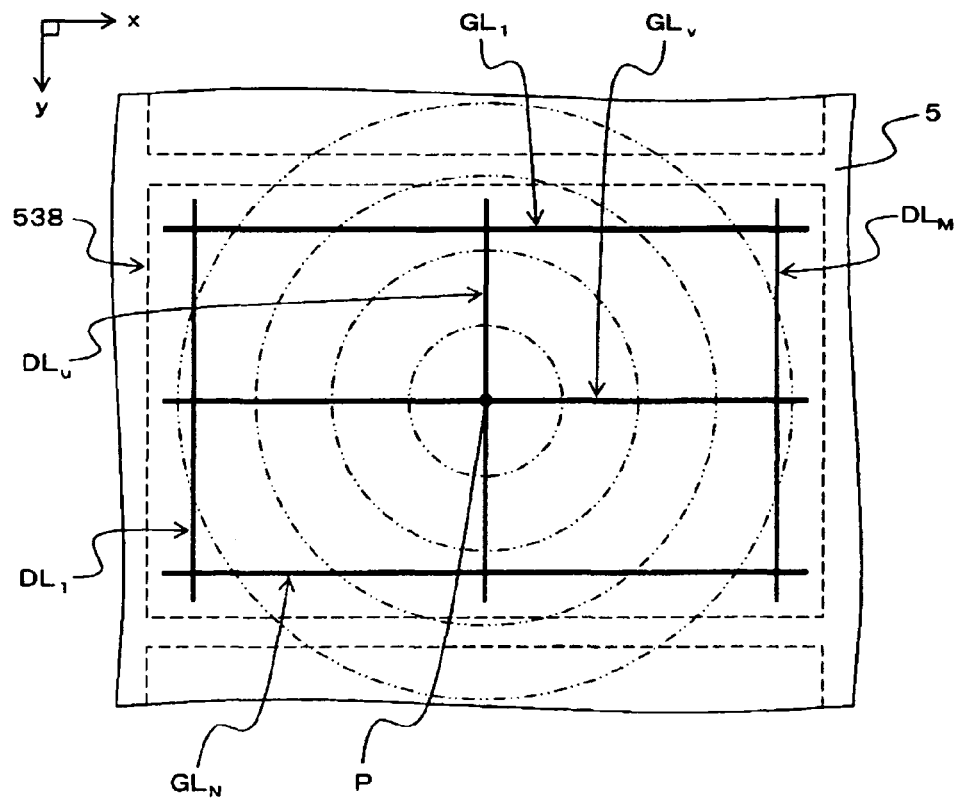
FIG. 17 is a model plan view depicting an example of a relationship of a fourth pattern of insulating layer thickness distribution to thickness of the gate insulating film in individual TFT elements.
Figure 18:
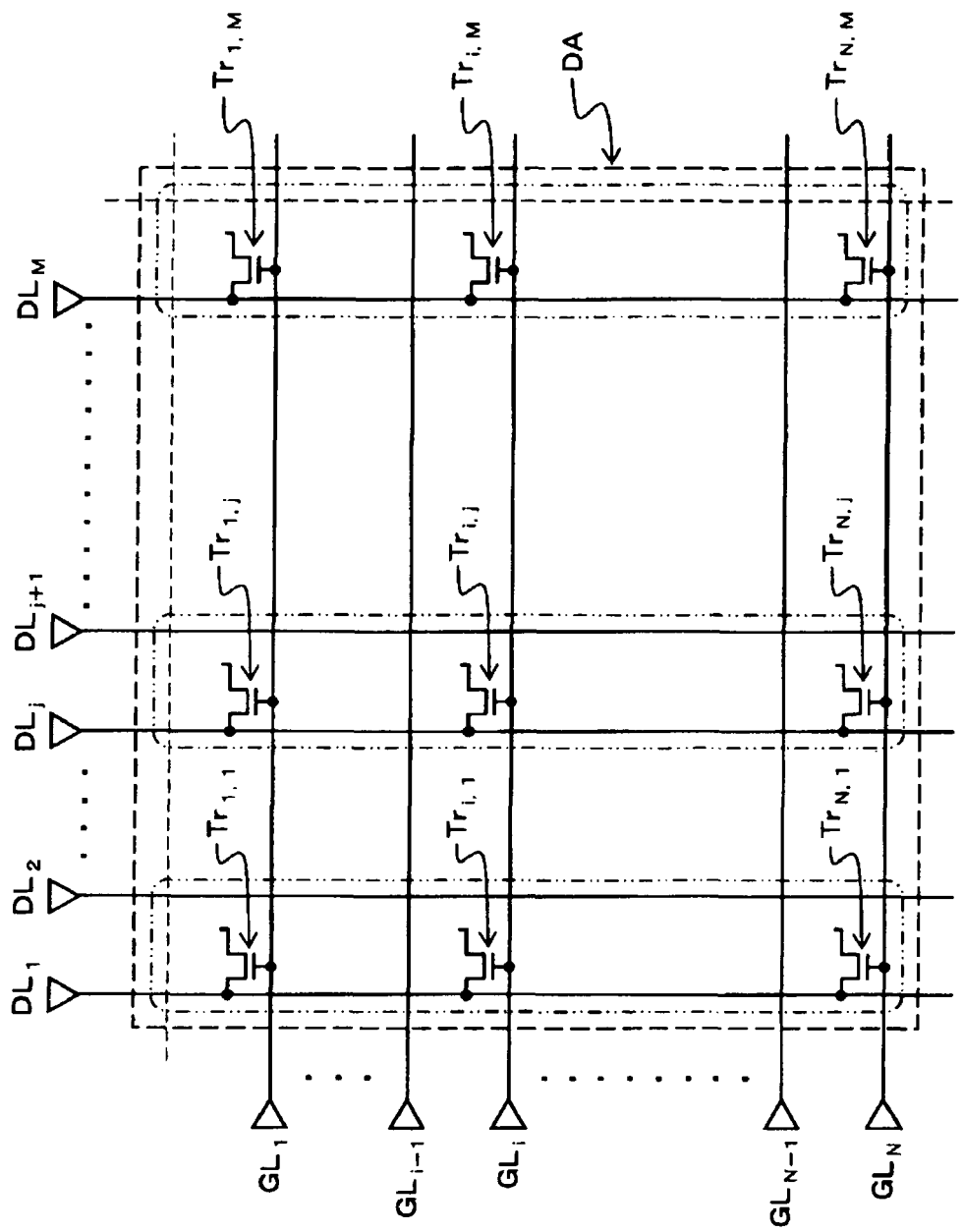
FIG. 18 is a model circuit diagram illustrating an example of a simplified configuration of a conventional liquid-crystal display panel.

Finally, the fourth pattern will be discussed. The fourth pattern is one in which the film thickness of the insulating film in the x direction and film thickness in the y direction varies as in the region 538 appearing in FIG. 13D. Reference is made to FIG. 17 in the following discussion of the relationship of this fourth pattern to the gate insulating films of the TFT elements (active elements) which are formed in the display area of a single TFT substrate 101.

FIG. 17 is a model plan view depicting an example of a relationship between the fourth pattern of insulating layer thickness distribution and the thickness of the gate insulating film in individual TFT elements.

The following discussion of the relationship between the fourth pattern of insulating layer thickness distribution and the thickness of the gate insulating films in individual TFT elements will focus by way of example on the TFT substrate which is formed in the region 538 of the mother glass 5 in the case of 15-panel fabrication as depicted in FIG. 17. In FIG. 17, $GL_1$, $GL_N$ denote the scan signal lines situated furthest outward in the display area; and $DL_1$, $DL_M$ denote the picture signal lines situated furthest outward in the display area. Between the two scan signal lines $GL_1$, $GL_N$ are situated a scan signal line $GL_v$ situated substantially at midpoint between them, and a number of additional scan signal lines which are not shown. Between the two picture signal lines $DL_1$, $DL_M$ are situated a picture signal line $DL_u$ situated approximately midway between them, and a number of additional picture signal lines which are not shown.

Here, the film thickness of the first insulating layer PAS1 on the scan signal line $GL_v$ will, for example, reach a maximum at or near the point at which the scan signal line $GL_v$ intersects the picture signal line $DL_u$, and progressively decrease further away from this point of intersection. For this reason, the film thickness of the gate insulating films of the TFT elements in which the gate is connected to the scan signal line $GL_v$ will, for example, reach a maximum in the gate insulating film of the TFT element in which the drain is connected to the picture signal line $DL_u$, and reach a minimum in the gate insulating film of the TFT element in which the drain is connected to the picture signal line $DL_1$ or in the TFT element in which the drain is connected to the picture signal line $DL_M$, or in both.

Meanwhile, the film thickness of the first insulating layer PAS1 under the picture signal line $DL_u$ will, for example, reach a maximum at or near the point of intersection of the scan signal line $GL_v$ with the picture signal line $DL_u$, and progressively decrease further away from this point of intersection. For this reason, the film thickness of the gate insulating films of the TFT elements in which the drain is connected to the picture signal line $DL_u$ will, for example, reach a maximum in the gate insulating film of the TFT element in which the gate is connected to the scan signal line $GL_v$, and reach a minimum in the gate insulating film of the TFT element in which the gate is connected to the scan signal line $GL_1$ or in the TFT element in which the gate is connected to the scan signal line $GL_N$, or in both.

Consequently, the film thickness of the gate insulating films of the TFT elements on the TFT substrate 101 which is formed in the region 538 of the mother glass 5 will, for example, reach a maximum in the gate insulating film of the TFT element in which the gate is connected to the scan signal line $GL_v$ and in which the drain is connected to the picture signal line $DL_u$, and progressively decrease in the gate insulating films of TFT elements further away from the TFT element in question. Individually setting the size (W/L) of the TFT elements based on such variation in thickness of the gate insulating films of the TFT elements, and on the locations of the signal input terminals of the scan signal line GL and the signal input terminals of the picture signal line DL with respect to the TFT substrate 101 formed in the region 538 accordingly make it possible to reduce variation among pixels in the magnitude of the pre-write voltage $V_L$ and in the magnitude of the feed-through voltage $V_{FT}$.

The above discussion made with reference to FIG. 17 pertains to the example of a TFT substrate formed in the region 538 of the mother glass 5 in the case of 15-panel fabrication; however, the intention is not to limit implementation to 15-panel fabrication. As also pertains to a TFT substrate formed in the center region in the case of 9-panel (H3×W3) fabrication, it will be possible to reduce variation among pixels in the magnitude of the pre-write voltage $V_L$ and in the magnitude of the feed-through voltage $V_{FT}$ by individually setting the size (W/L) of the TFT elements with an approach similar to that for the TFT substrate of the region 538.

Embodiment 2 pertains to the film thickness distribution during formation of the first insulating layer PAS1 which functions as the TFT element gate insulating films; however, the technique herein is not limited thereto. It would be possible to produce similar film thickness distribution during formation of the conducting films which constitute the scan signal lines GL or the picture signal lines DL, or during formation (deposition) of the amorphous silicon film which forms the semiconductor layer SC. It shall be apparent that the size (W/L) of individual TFT elements may thus be established in consideration of the thickness distribution of the conducting films or semiconductor film, in addition to the thickness distribution of the first insulating layer PAS1.

The foregoing description of the present invention based on certain preferred embodiments is provided for illustration only and not by way of limitation; various modifications such as the following can be made herein without departing from the scope of the invention.

For example, whereas in Embodiment 1 and Embodiment 2 the individual pixel design is described using by way of example the TFT substrate 101 having the design illustrated in FIG. 3A through FIG. 3C, it shall be apparent that the present invention can be implemented even when the individual pixel design is some other design. Specifically, the present invention can be implemented even when the TFT elements (active element) have some other planar morphology. Moreover, the present invention can be implemented, for example, when additional lines separate from the scan signal line GL are provided, with the holding capacitor being formed by these other lines, the pixel electrodes PX, and an insulating layer intervening therebetween. Furthermore, the present invention can be implemented, for example, where counter electrodes CT are provided on the TFT substrate 101.

Moreover, whereas the descriptions in Embodiment 1 and Embodiment 2 pertain by way of example to the TFT substrate 101 of a liquid-crystal display device (liquid-crystal display panel), the present invention is not limited to liquid-crystal display devices and can be implemented in other types of display devices as well. Specifically, the present invention can be implemented generally in any display device having a display panel which is similar in design to the TFT substrate 101 described in Embodiments 1 and 2, and which displays video or images by a similar principle of operation; and can thereby yield reduced luminance irregularity and flicker, and improved display quality. An example of such a display device is one having a light-emitting type display panel employing organic EL (electroluminescence).

What is claimed is:
1. A display device, comprising:
   a plurality of scan signal lines;
   a plurality of picture signal lines three-dimensionally intersecting the plurality of scan signal lines;
   numerous TFT elements arranged in a matrix; and
   a display panel in which each of the numerous TFT elements has a gate connected to one of the plurality of scan signal lines, and a drain or source connected to one of the plurality of picture signal lines;
   wherein the numerous TFT elements respectively differ in terms of channel width, channel length, or both, depending on a distance from a signal input terminal of the scan signal line to which the gate is connected and on a distance from a signal input terminal of the picture signal line to which one of the drain and the source is connected;
   wherein a plurality of TFT elements among the numerous TFT elements arranged in a matrix, in which the gate is connected to a common scan signal line have a value obtained by dividing the channel width by the channel length, wherein the value increase with increasing distance from the signal input terminal of the scan signal line;
   wherein plurality of TFT elements among the numerous TFT elements arranged in a matrix, in which either one of the drain and the source is connected to a common picture signal line have a value obtained by dividing the channel width by the channel length, the value increasing with increased distance from the signal input terminal of the picture signal line;
   wherein a difference in the value obtained by dividing the channel width by the channel length in neighboring pairs among the plurality of TFT elements in which the gate is connected to the common scan signal line decreases with increased distance from the signal input terminal of the scan signal line; and
   wherein a difference in the value obtained by dividing the channel width by the channel length in neighboring pairs among the plurality of TFT elements in which either one of the source and the drain is connected to the common picture signal line decreases with increased distance from the signal input terminal of the picture signal line.

2. The display device of claim 1 wherein a rate of change in the value obtained by dividing the channel width by the channel length for the plurality of TFT elements in which the gate is connected to the common scan signal line changes upon reaching a specific TFT element among the plurality of TFT elements, the rate of change in the value obtained by dividing the channel width by the channel length for TFT elements closer than the specific TFT element to the signal input terminal of the scan signal line being greater than the rate of change in the value obtained by dividing the channel width by the channel length for TFT elements further than the specific TFT element from the signal input terminal of the scan signal line; and a rate of change in the value obtained by dividing the channel width by the channel length for the plurality of TFT elements in which either one of the drain and the source is connected to the common picture signal line changes upon reaching a specific TFT element among the plurality of TFT elements, the rate of change in the value obtained by dividing the channel width by the channel length for TFT elements closer than the specific TFT element to the signal input terminal of the picture signal line being greater than the rate of change in the value obtained by dividing the channel width by the channel length for TFT elements further than the specific TFT element from the signal input terminal of the picture signal line.

3. The display device of claim 2, wherein the specific TFT element among the plurality of TFT elements in which the gate is connected to a common scan signal line is a TFT element situated at or near a position that divides a distance in a 1:2 ratio between the TFT element closest to the signal input terminal of the scan signal line and the TFT element furthest from the signal input terminal of the scan signal line; and the specific TFT element among the plurality of TFT elements whose drain or source is connected to a common picture signal line is a TFT element situated at or near a position that divides in a 1:2 ratio a distance between the TFT element closest to the signal input terminal of the picture signal line and the TFT element furthest from the signal input terminal of the picture signal line.

4. A display device, comprising:

a plurality of scan signal lines;

a plurality of picture signal lines three-dimensionally intersecting the plurality of scan signal lines;

numerous TFT elements arranged in a matrix; and a display panel in which each of the numerous TFT elements has a gate connected to one of the plurality of scan signal lines, and a drain or source connected to one of the plurality of picture signal lines;

wherein the numerous TFT elements respectively differ in terms of channel width, channel length, or both, depending on a distance from a signal input terminal of the scan signal line to which the gate is connected and on a distance from a signal input terminal of the picture signal line to which one of the drain and the source is connected, and wherein a thickness of a gate insulating film of the TFT elements arranged in a matrix differs depending on the distance from the signal input terminal of the scan signal line to which the gate is connected and on the distance from the signal input terminal of the picture signal line to which either one of the drain and the source is connected.

* * * * *